United States Patent [19]
Richardson et al.

[11] Patent Number: 5,532,687
[45] Date of Patent: Jul. 2, 1996

[54] MODULAR MAGNETIC SCOUR MONITORING DEVICE AND METHOD FOR USING THE SAME

[76] Inventors: Jerry R. Richardson, 2912 Cortez St., Fort Collins, Colo. 80525; Gerald R. Price, 300 Flicker St., Fort Collins, Colo. 80526; Everett V. Richardson, 824 Gregory Rd., Fort Collins, Colo. 80524; Peter F. Lagasse, 3412 Shore Rd., Fort Collins, Colo. 80524

[21] Appl. No.: 999,616

[22] Filed: Dec. 31, 1992

[51] Int. Cl.$^6$ .................................................. G08C 17/04
[52] U.S. Cl. .............................. 340/870.33; 340/870.16; 340/870.3; 73/312; 73/322.5; 324/207.22; 405/15; 405/73; 405/211
[58] Field of Search .......................... 340/870.16, 870.3, 340/870.33; 73/86, DIG. 5, 309, 312, 314, 322.5; 324/207.22, 207.24, 207.13; 405/15, 73, 74, 211; 367/908

[56] References Cited

U.S. PATENT DOCUMENTS

| | | | |
|---|---|---|---|
| 3,617,996 | 11/1971 | Herbert | 340/3 |
| 3,942,149 | 3/1976 | Westfall, Jr. | 340/3 |
| 4,000,651 | 1/1977 | Christiansen | 73/314 |
| 4,064,755 | 12/1977 | Bongort et al. | 73/DIG. 5 |
| 4,122,429 | 10/1978 | Hatai | 340/3 |
| 4,229,972 | 10/1980 | Phillips et al. | 73/304 |
| 4,717,286 | 1/1988 | Loer | 406/74 |
| 4,796,473 | 1/1989 | Custer | 73/DIG. 5 |
| 4,827,769 | 5/1989 | Riley et al. | 73/313 |
| 4,855,966 | 8/1989 | Cinquino | 367/99 |
| 5,076,101 | 12/1991 | Lazure | 73/DIG. 5 |

FOREIGN PATENT DOCUMENTS

| | | | |
|---|---|---|---|
| 0822008 | 4/1981 | U.S.S.R. | 73/86 |
| 2245736 | 8/1992 | United Kingdom | G08B 21/00 |

OTHER PUBLICATIONS

Third Bridge Engineering Conference; Transportation Research Board; Mar. 1991; pp. 281–293.
Field Measurement of Scour Depth Using a Portable Gamma Spectrometer; B. Melville; Jul. 1982; pp. 1–12.
Detecting Scour at Bridge piers; Research Focus; Oct. 1990; p. 3.
Brisco Monitor Bridge Scour Monitor; The Prepakt Concrete Company; E. Richard Colle, Sep. 1989.
Field Measurement of Scour Depth; Department of Civil Engineering; University of Auckland; Jan. 1979; pp. 1–10.
Measurement of Bridge Scour; B. W. Melville; (Oct. 10–12, 1989) pp. 1–11.

*Primary Examiner*—Jeffery A. Hofsass
*Assistant Examiner*—Daniel J. Wu
*Attorney, Agent, or Firm*—Luke Santangelo

[57] ABSTRACT

A modular scour monitoring device which employs magnets located within a weighted descending collar is designed for placement about bridge piers, abutments and the like, such that the occurrence of scour causes descent of the collar. This descent is carefully monitored against the initial reference point using one of two systems: a magnetic detecting probe unit or a magnetic switch array. The probe unit utilizes a graduated cable with a magnet detector mounted at one end and a signalling device at the other. The switch array system employs electrical components which are selectively activated with the descent of the collar, permitting periodic readings of the arrays various electrical properties to reveal the new depth. A wide variety of accessory systems may be used in conjunction with the present invention to permit remote monitoring, visual, audible or other warning signals, and data storage and control. The modular design permits effortless storage and shipping of individual units, and more importantly construction of a monitoring unit without expensive construction equipment.

88 Claims, 19 Drawing Sheets

| | | |
|---|---|---|
| 3/2 | 00218 | 340 |
| 01:00 | 00235 | 45 |
| 01:30 | 00321 | 190 |
| 02:00 | 00189 | 101 |
| 02:30 | 00342 | 333 |
| 03:00 | 12039 | 333 |
| 3/3 | 11000 | 78 |
| 04:00 | 01985 | 211 |
| 04:30 | 20493 | |
| 05:00 | 00284 | 345 |
| 05:30 | 02934 | 346 |
| 06:00 | 18234 | 753 |

Fig. 12

MODULAR MAGNETIC SCOUR MONITORING DEVICE AND METHOD FOR USING THE SAME

FIELD OF THE INVENTION

The present invention relates to scour monitoring devices. Specifically, the present invention relates to scour monitoring devices which can be easily installed on most existing structures, including bridge piers, abutments, retaining walls, dams, locks, drilling rigs, lighthouses, radar platforms, and the like.

BACKGROUND OF THE INVENTION

It is believed that the earliest studies of scour occurred during the early 19th century by railroad engineers. These were probably unscientific and sporadic observations at best. By the turn of the century, hydraulic engineers became involved in laboratory studies of pier scour, but the main responsibilities for field studies were borne largely by the railways. In a number of foreign countries this tradition remains even today.

Scour is the result of the erosive action of flowing water, excavating and carrying away material from the bed and banks of streams. Naturally, not all materials scour at the same rate, which makes the predictability of scour very difficult. This phenomena typically occurs in stream and river bottoms during periods such as heavy rainfalls and spring runoffs. The result can sometimes be cavities having depths twice that of the water depth. Unfortunately, while the evidence of scour is obvious during its occurrence, as water levels recede and flow conditions return to normal these cavities often refill making detection difficult. These difficulties in prediction, and late detection of scour have led to the necessity of monitoring sites for the occurrence of scour.

Equipment used for scour observations has usually been quite simple: sounding rods for shallow flows and lead sounding weights on a line for deeper flows. Both of these devices were developed to sound for navigation depths hundreds of years ago, and were adapted for depth soundings in connection with stream flow measurements during the 19th century. The main adaptations involved streamlining the sounding weights and using stay lines or vertically supported sounding rods so that the weights or rods would not be swept downstream in high velocities. Early stream flow measurements were often made at ferry crossings, and special supports were designed to mount on the ferry cable so that the sounding rod with the meter could be held vertically approximately three feet in front of the bow of the ferry.

Eventually, these crude devices gave way to more advanced equipment. In the 1950's significant advances were made in sonar, sonic sounders, electronic positioning equipment, and radar. There were problems with these techniques, however. Accuracy, flow depth restrictions, and perhaps most importantly since many existing bridges are maintained by small local authorities, high cost— all acted as significant disadvantages of these devices. For example, sediment concentration along the Yellow River is so high that the standard sonic sounders cannot distinguish between the moving sediment and the non-moving bed. U.S. Pat. No. 4,855,966 to Cinquino shows one particular sonic device wherein a housed probe descends within a scour hole, and a bridge mounted sonic transducer operates to determine the distance of the probe from a reference point on the bridge.

Another technique, as shown in U.K. Patent Application No. GB 2245736 to Waters, uses buried omni-directional mercury switches. As scour occurs and the switches are unburied, the water flow causes these switches—of which there are only three—to actuate sending a signal to a bridge mounted monitor. The installation of this device is very delicate and cannot be merely driven into the stream bed like the present invention. Instead, a large area of the bed must be dug up, and then refilled after insertion of the Waters' unit. Disturbing the stream bed in this fashion actually increases the area's susceptibility to scour. The Waters device is also relatively expensive due in part to the installation process.

Still another device, known only to have been used in New Zealand as long ago as 1982, employed a radioactive source housed within a large lead weight. This device is described in the printed publication entitled "Field Measurement Of Scour Depth Using A Portable Gamma Spectrometer" by B. W. Melville, and submitted as Report No. 287 to the Department of Civil Engineering at the University of Auckland, in Auckland, New Zealand. In Melville's device a gamma-ray probe was used to determine the location of a radioactive material (Cobalt 60) contained within the lead weight as it sank into a scour hole. It is believed that the general U.S. population would look unfavorably on the use of radioactive material in their various water supplies.

In preparation for development of the present invention, criteria needed to be established for defining effective scour monitoring devices. They include: 1) a capability for installation on or near a bridge pier or abutment; 2) an ability to measure maximum scour depth within an accuracy of +0.5 feet; 3) an ability to obtain scour depth readings from above the water or from a remote site; and 4) an ability to operate during storm and flood conditions. Other desirable criteria were also established, and include: 1) a capability to be installed on most existing bridges or during construction of new bridges; 2) a capability to operate in a range of flow conditions; 3) a capability to withstand ice and debris; 4) relatively low cost; 5) vandal resistant; and 6) an ability to be operated and maintained by highway maintenance personnel. Until the present invention, no scour monitoring device has met each of these criteria. The present invention meets or exceeds each of these criteria.

The present invention, in both its apparatus and methods, recognizes and addresses these criteria and overcomes the limitations perceived by those skilled in the art by presenting a design which, among other aspects, allows for installation near a bridge pier or abutment on existing bridges as well as new constructions. Those skilled in the art of scour monitoring device design have long been aware of the problems of accuracy, high cost, remote operation, and maintenance or repair. Millions of dollars have been spent to date in research by those using sonic sounders, sonar, electronic positioning equipment, and radar, All the while the necessary arts and elements for implementing the disclosed invention have existed for sometime. The various patents cited show substantial attempts by those skilled in the field to meet a few of the above criteria, but they have failed to create a reliable instrument which meets and exceeds all the required and desired criteria. Some have been able to install upon new and existing bridges, others have discussed remote data collection, and still others have addressed the accuracy concerns. However, a single system which integrates these capabilities into a reliable inexpensive scour monitoring device has not existed until the present invention. Instead of understanding the true problems, manufacturers have coped with the inherent limitation to some of these devices and methods. There appeared to be a failure to fully understand the problems and impacts of properly monitoring bridge scour.

SUMMARY OF THE INVENTION

The present invention discloses a scour monitoring system to operate in conjunction with bridge piers, abutments and the like, such as used in lakes, streams, tidal estuaries, rivers, reservoirs, and other bodies of water. The device provides a reliable and effective means for monitoring the event of scour during normal and abnormal operating conditions. Rather than supplying a system which affords only an incremental increase in performance and design over the prior art, the present invention utilizes techniques which were not previously considered to achieve leaps in performance compared to the prior art. This invention in its broadest function serves to warn of a potentially dangerous condition by monitoring the degree of scour which occurs about a bridge pier or abutment. Additionally, it serves to optimize the monitoring procedure by allowing remote telemetry of data, and to optimize the operation and maintenance of the system by providing a design which is easily managed by highway maintenance personnel.

In general terms, the invention involves various embodiments of a scour monitoring system. Many of the elements of this device achieve several different objects which, when combined, act to achieve the mentioned leaps in performance. In one of the embodiments, the invention discloses a switch array made of a plurality of magnetic switches and electrical components for producing a quantifiable signal to allow direct measurement by a control unit, such as, but not limited to a computer or programmable processor. These switches, and thereby the electrical components, are activated by a descending open-architecture collar having an attached magnet. The device may also feature a data logger which permits the system to store and retrieve data with ease and accuracy. Still other features of the present device include a telemetry system which allows for the realization of remote interface with the system, and early warning mechanisms which expedite the indication of danger to the appropriate personnel.

Importantly, the invention breaks from several time-honored traditions in scour monitoring. While drawing from some of the important conditions demanded of these devices for providing an effective indicator, as discussed previously, the invention expands upon these conditions in an effort to provide a reliable, inexpensive device which can be employed on existing structures as well as new constructions. By recognizing and utilizing the advantages of magnetic switches, magnetic detectors, and prefabricated tubing, and designing a system with these elements the present invention achieves its goals.

Accordingly, the present invention provides a scour monitoring system which is capable of determining at any given time the greatest amount of scour to have occurred at a bridge pier or abutment site. The stated invention acts to warn the necessary authorities, and even employ affirmative acts, to prevent catastrophe. The system may utilize a less interactive embodiment which uses a magnetic probe to determine the degree of scour. In addition, the same magnetic collar is employed to descend as each event of greater scour occurs. To properly determine the extent of scour, the probe is lowered either manually or automatically until the depth of the collar is confirmed.

In view of the above it is therefore a stated object of the present invention to provide a design which is capable of growing from a basic unit design of three simple components, to a sophisticated system with many supplemental features. Each unit is designed for attachment to the bridge, including curved pipe sections which allow extension right up to the surface of the bridge. The various prefabricated pipe or conduit sections should be sturdy enough to withstand a variety of weather conditions, as well as any impact that may occur from floating or migrating matter within the body of water, such as boulders, logs, ice, vessels and the like.

It is another object of the present invention to provide a design which accurately determines the amount of scour which has taken place at a critical bridge pier or abutment. The invention is designed to permit periodic or continuous data collection. The data collection may occur at the site of each unit—as in using a housed data logger for regular inspection of the data—or it may occur for each unit at a central remote data collection office—through use of RF transmissions, satellite uplinks, or phone lines.

It is still another object of the present invention to provide a design which permits the entities—governments, companies, individuals—charged with the operation and control of these systems to utilize a single probe for any number of units. It is desirable to utilize a graduated cable which can be compacted and carried from one unit to the next. This feature allows for significant economic savings for multiple unit entities.

It is still another object of the present invention to provide a design which permits simple construction of a basic unit—particularly involving the setting of the main tubing. It is an object to provide a design which can be either manually driven into the stream bed via hammer or air jack, or can be pneumatically or hydraulically driven into the stream bed by a jetting process involving a unique driving tip. Naturally, both methods may be employed simultaneously.

Finally, it is still another object of the present invention to provide a modular design which permits easier installation and shipping of units. The modular design consists of segmented tubing and a removable collar, as well as detachable accessories. In shipping, smaller parcels may be used for transporting each unit, and in construction, manual driving techniques may be employed. These advantages allow for significant economical savings over the methods and designs used in much of the prior art.

Naturally, further objects of the invention are disclosed throughout other areas of the specification and claims.

BRIEF DESCRIPTION OF THE DRAWINGS

The following descriptions and referenced drawings are for selected preferred embodiments of the present invention. Naturally, changes may be made to the disclosed embodiments while still falling within the scope and spirit of the present invention and the patent granted to its inventors.

FIG. 12 shows a sample printout, with time and date stamp for each reading.

DETAILED DESCRIPTION OF THE PREFERRED EMBODIMENTS

Figure 1:
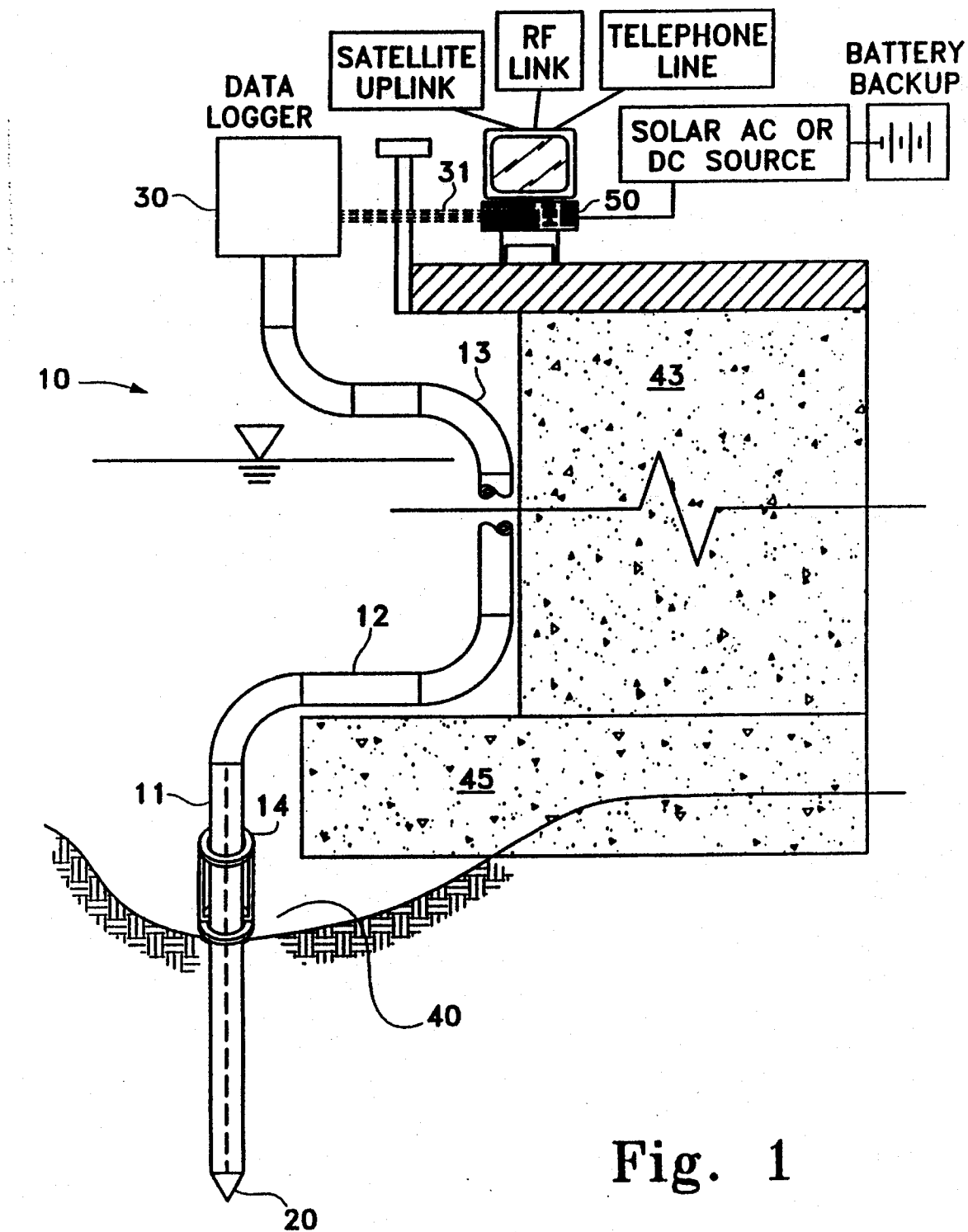
FIG. 1 is a side view of one embodiment of the present invention illustrating the system's cooperation with the bridge pier, the bridge foundation, the bridge, the stream bed, and the body of water. Additionally, a data logger and remote telemetry system are shown as data is received at a central data collection site.
Figure 2:
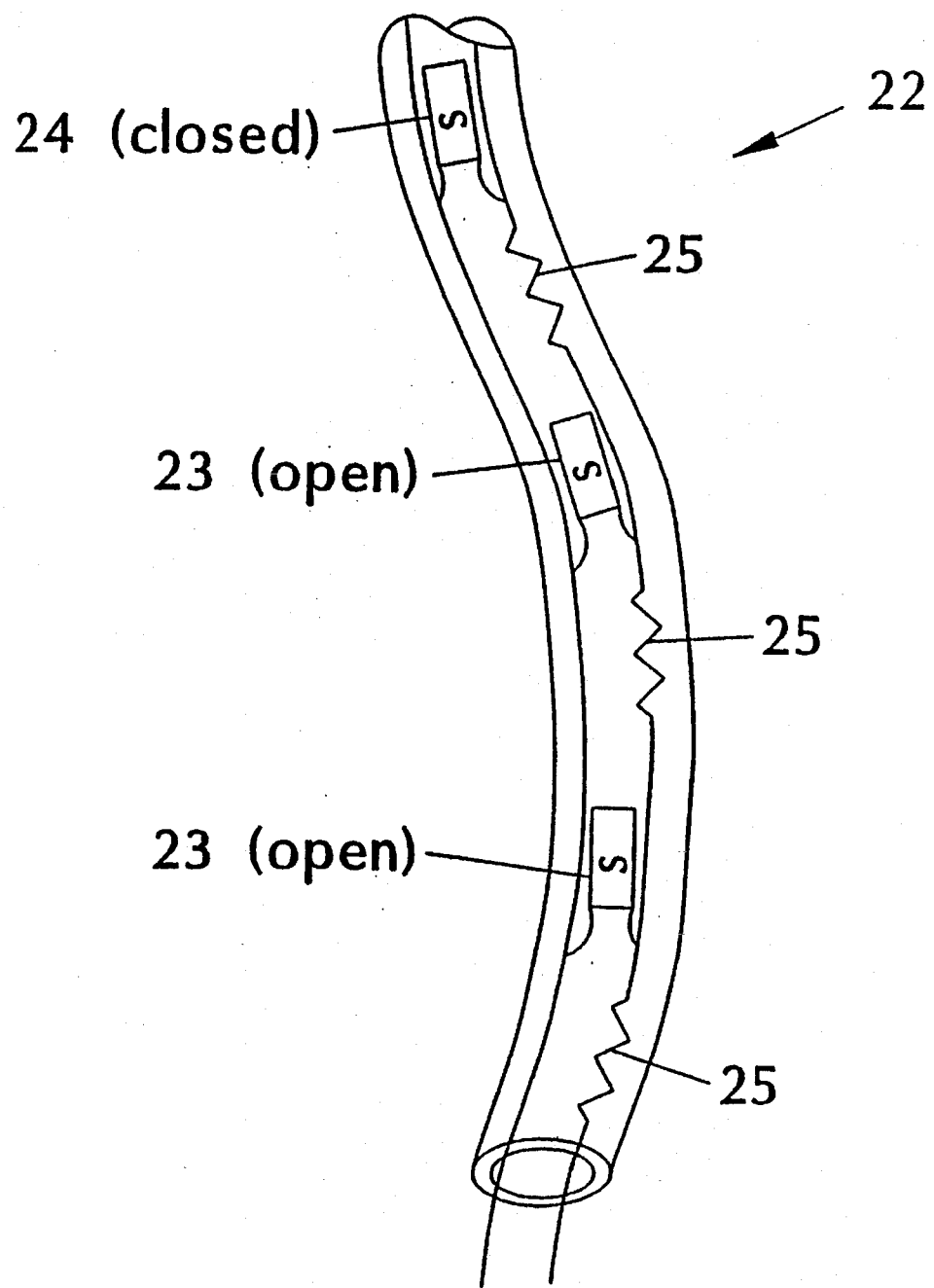
FIG. 2 is a cross-sectional view of a section of flexible pipe of one embodiment of the present invention showing the internal magnetic switches and the connected electrical components. Some switches are open while others are in a tripped or closed position.
Figure 2A:
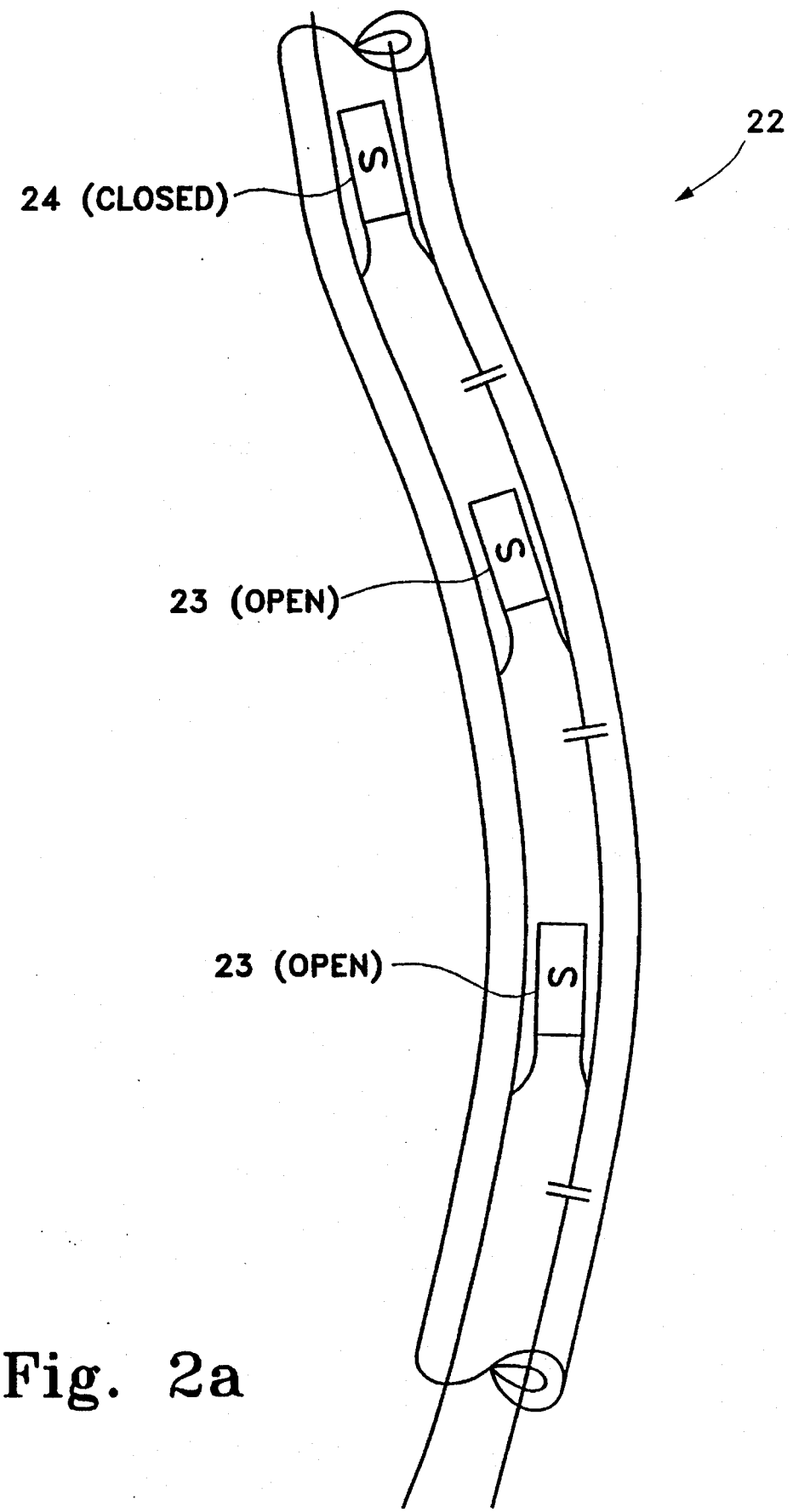
FIG. 2a is a cross-sectional view of a section of flexible pipe of one embodiment of the present invention showing the internal magnetic switches and the connected capacitors. Some switches are open, while others are in a tripped or closed position.
Figure 2B:
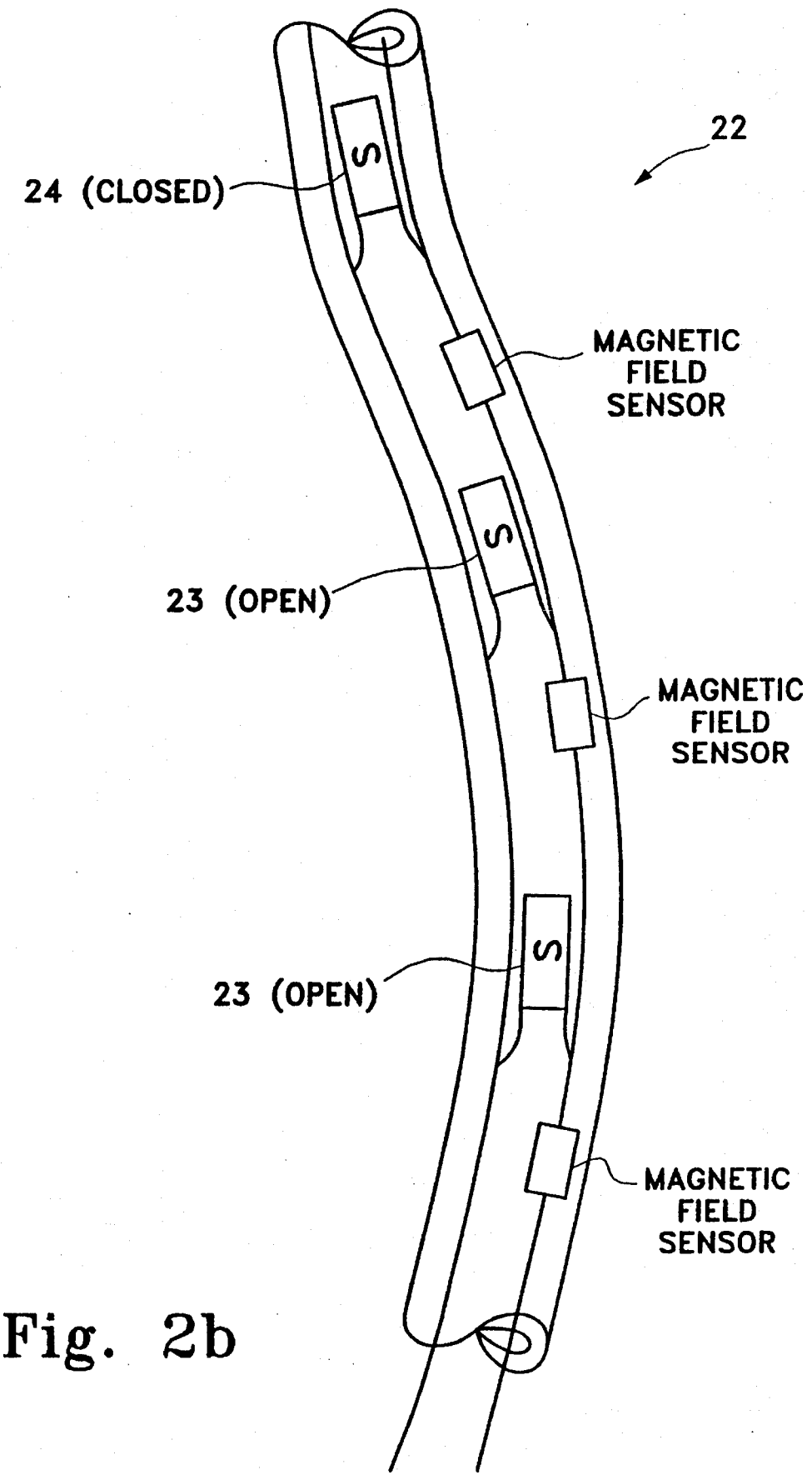
FIG. 2b is a cross-sectional view of a section of flexible pipe of one embodiment of the present invention showing the internal magnetic switches and the connected magnetic field sensors. Some switches are open, while others are in a tripped or closed position.
Figure 9:
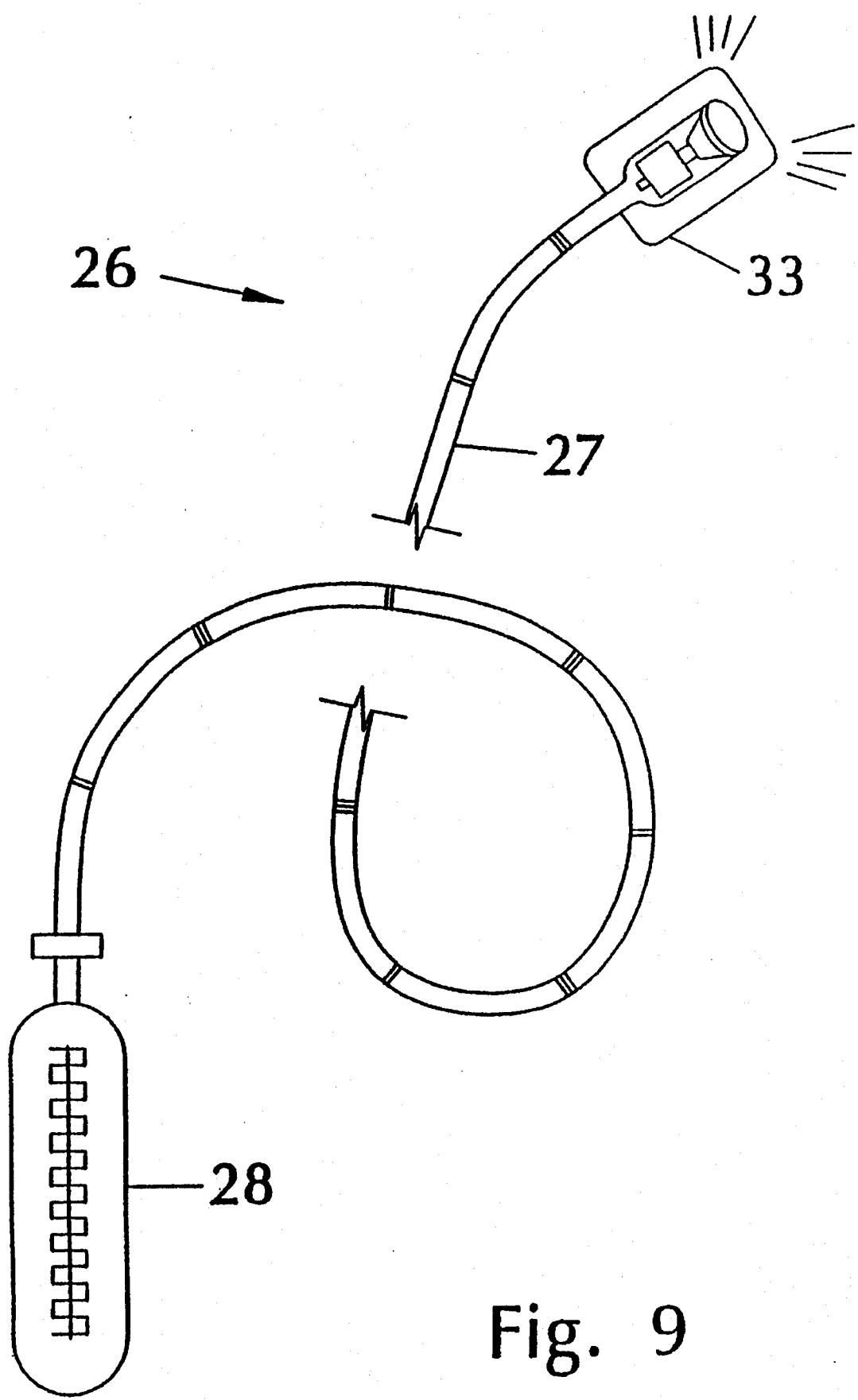
FIG. 9 is a detailed view of the magnetic probe as used in one embodiment of the present invention.

As can be seen from the various drawings, the basic concepts of the present invention may be embodied in many different ways. These embodiments include variations on two distinct system designs. In FIG. 1 one such embodiment is shown as it might be attached to bridge pier (43). In each different embodiment of both systems, weighted collar (14), and main section of piping (11) are fundamental elements. Elements which distinguish the two systems are switch array (22), as shown in FIG. 2, and probe (26), as shown in FIG. 9. Additional optional elements which may be employed by both systems include straight and curved extension pipe (12 and 13, respectively), data logger (30), driving tip (20), and telemetry system (31). These elements are detailed in the following discussion as each relates to the function of monitoring system (10).

While the designs and concepts disclosed herein focus upon and may find use for the monitoring of bridge scour, they may also obviously find use in a wide variety of other applications. It should therefore be understood, that while the field of application of the invention is discussed in a limited concept, the scope of protection afforded is not intended to be so limited.

Figure 13:
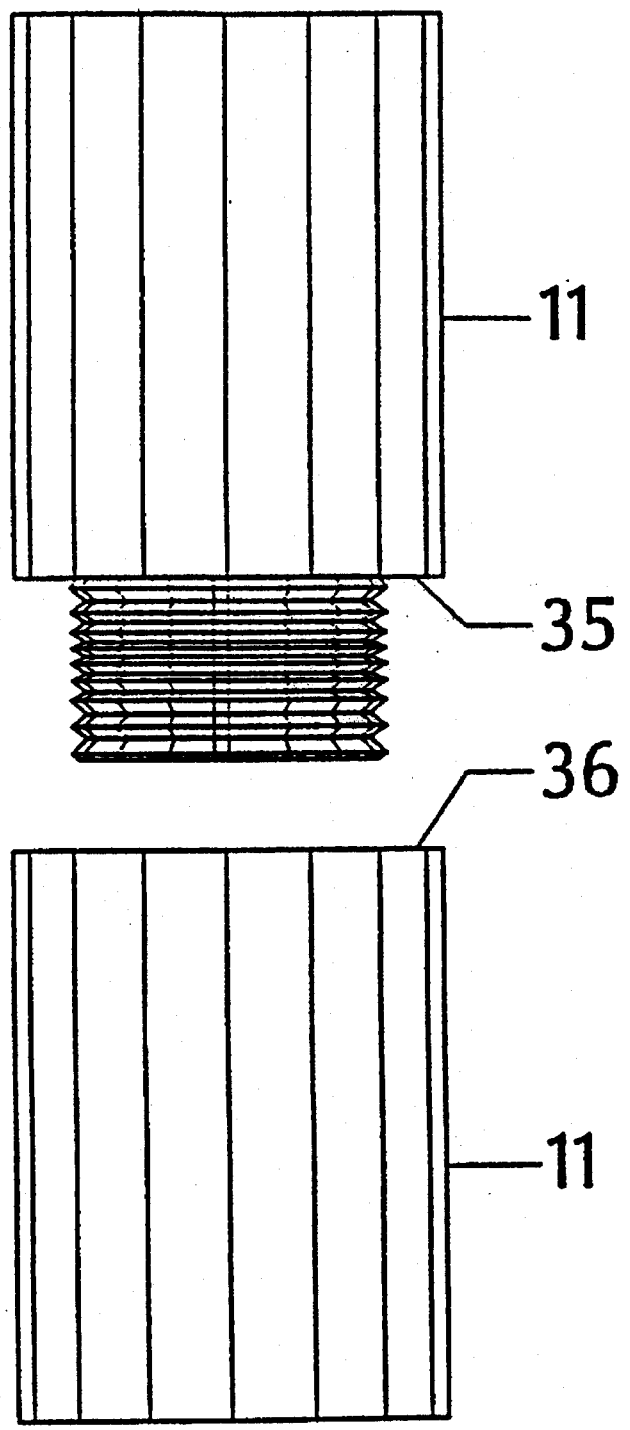
FIG. 13 shows a close-up of one type of coupling which may be used between adjacent sections of tubing.

To begin it is imperative that discussion begin with installation of a basic skeleton unit (ie., just the framework). Main section tubing (11) comes in various lengths, preferably 5, 10 and 15 feet units. As these sections must not be ferrous material, and for structural strength and corrosion protection, stainless steel is a preferred composition. Hardened plastics, as they currently exist, while corrosion resistant, have proven too brittle for most applications. Each section (11) should have both male end (35) and female end (36), as shown in FIG. 13, to allow for greater lengths when necessary. The segmented skeleton unit is designed so that when male end (35) is attached to female end (36), the outside surface of main section tubing (11) is flush—without any discontinuities between sections. This feature allows for the free movement of collar (14) over the coupled sections. The internal surface of main section tubing (11) can vary in diameter, but must present a smooth transition between these diameters. The interior is designed, in the present embodiment, so that the transition in diameter is smooth with no sharp discontinuities which would impede insertion of instruments for detecting the location of collar (14).

Figure 14A:
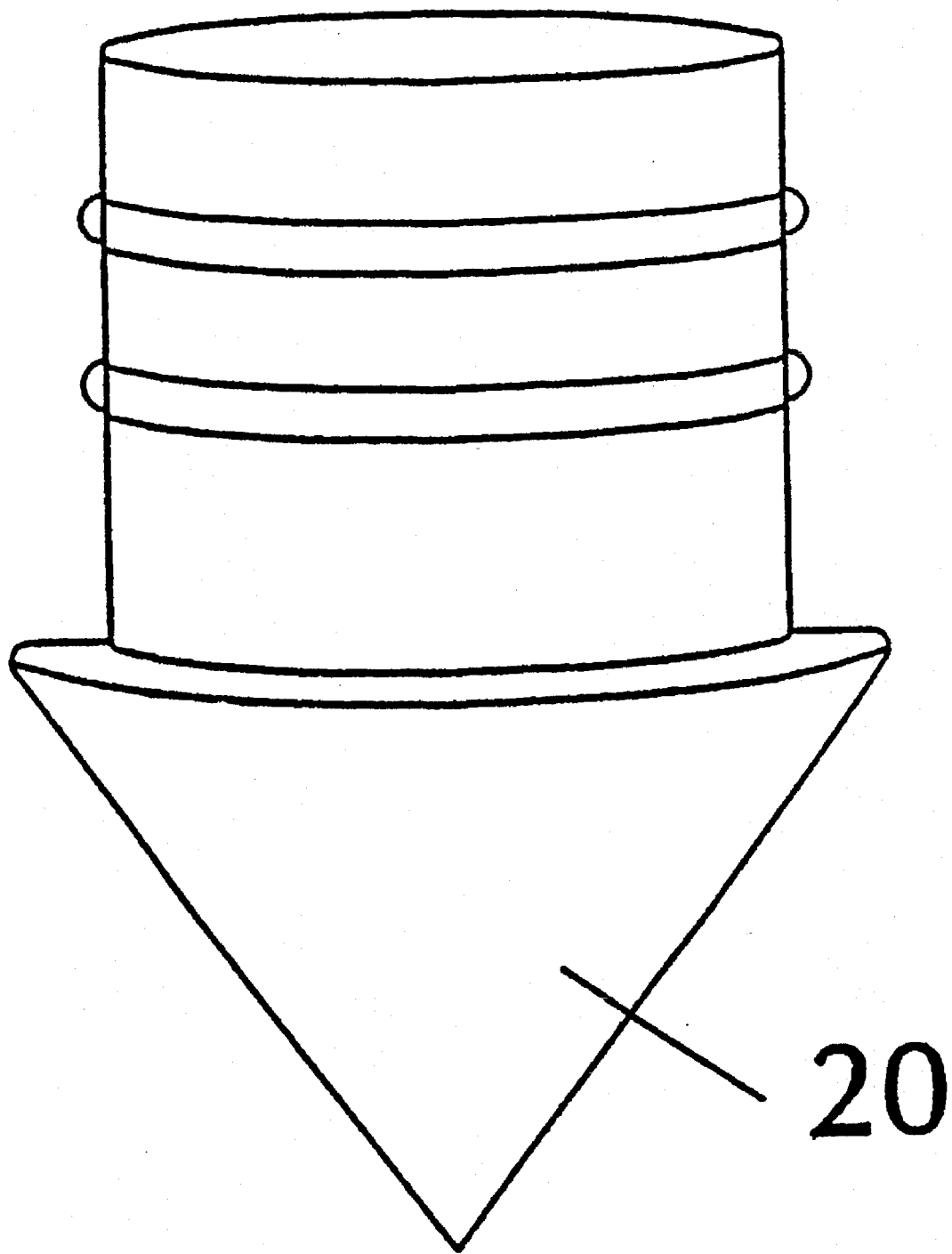
FIGS. 14a and 14b show possible driving tips which may be used in construction of the present invention.
Figure 14B:
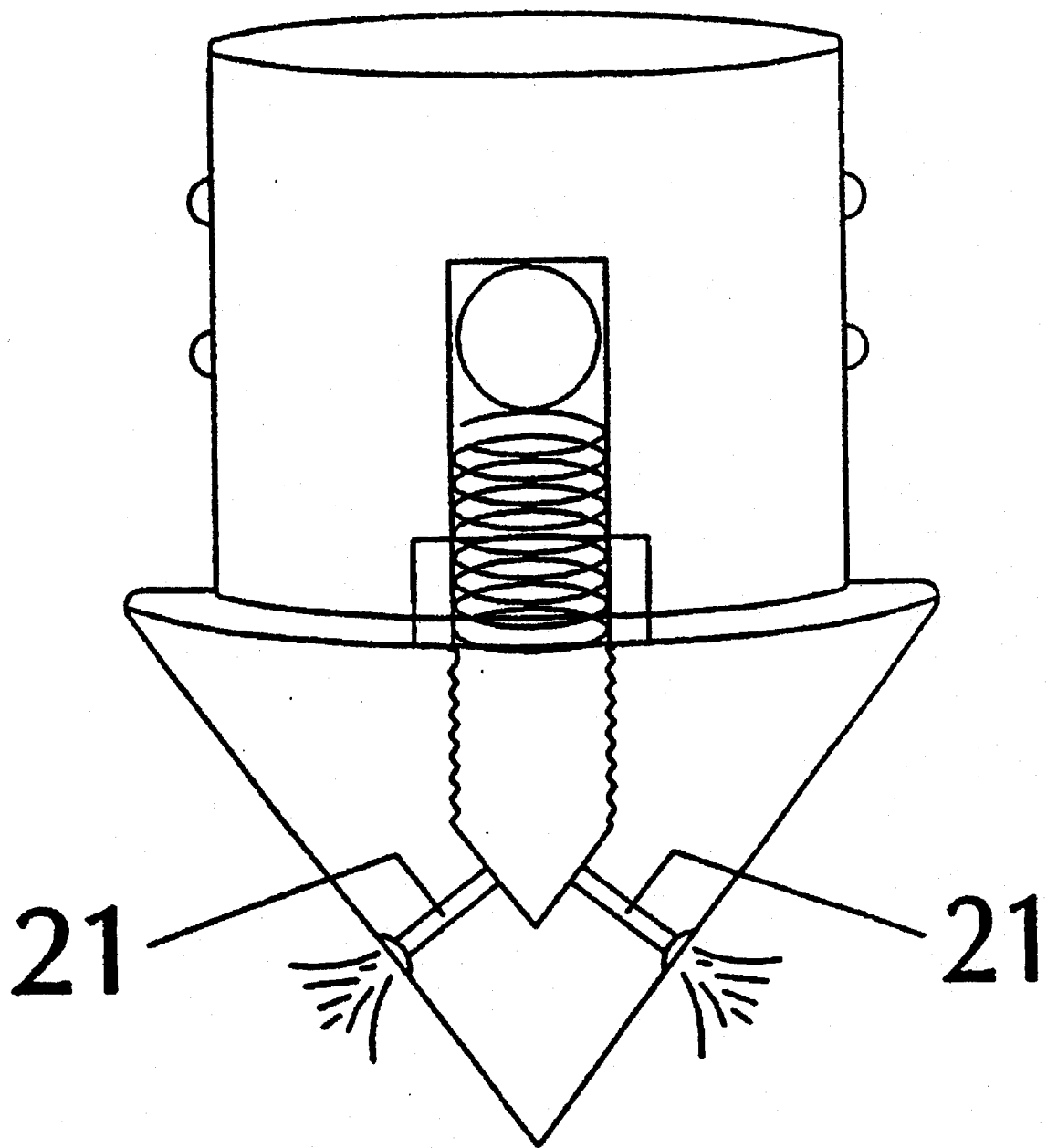

A coupling of any type, such as threaded ends as shown in FIG. 13, will suffice to adjoin two sections. Naturally, many other pipe coupling devices may be suitable for use with the present invention. After a desired length of main tubing is erected, driving tip (20), as shown in FIGS. 14a and 14b, may be connected. At this point main section (11) is ready for installation into stream bed (41).

Driving tip (20) may simply be a case hardened steel cone which facilitates the advancement of main tubing (11) into stream bed (41) when forced downward. The force can either take the form of manually pounding (with a sledge hammer, perhaps) or automated pneumatic pounding (air hammer). Alternatively hydraulic operations may be employed using tip (21) as shown in FIG. 14b. Tip (21) is designed with jetting nozzles which allow water to be forced through tip (21) and into stream bed (41). This, of course, also facilitates the advancement of tubing (11) into stream bed (41). The two methods may be simultaneously employed if desired. It has been found that for most installations main tubing (11) should be driven approximately 3 feet below the anticipated maximum depth of scour or to a depth approximately 3 feet below which the lowering of the bed would result in certain failure of the structure.

Figure 3:
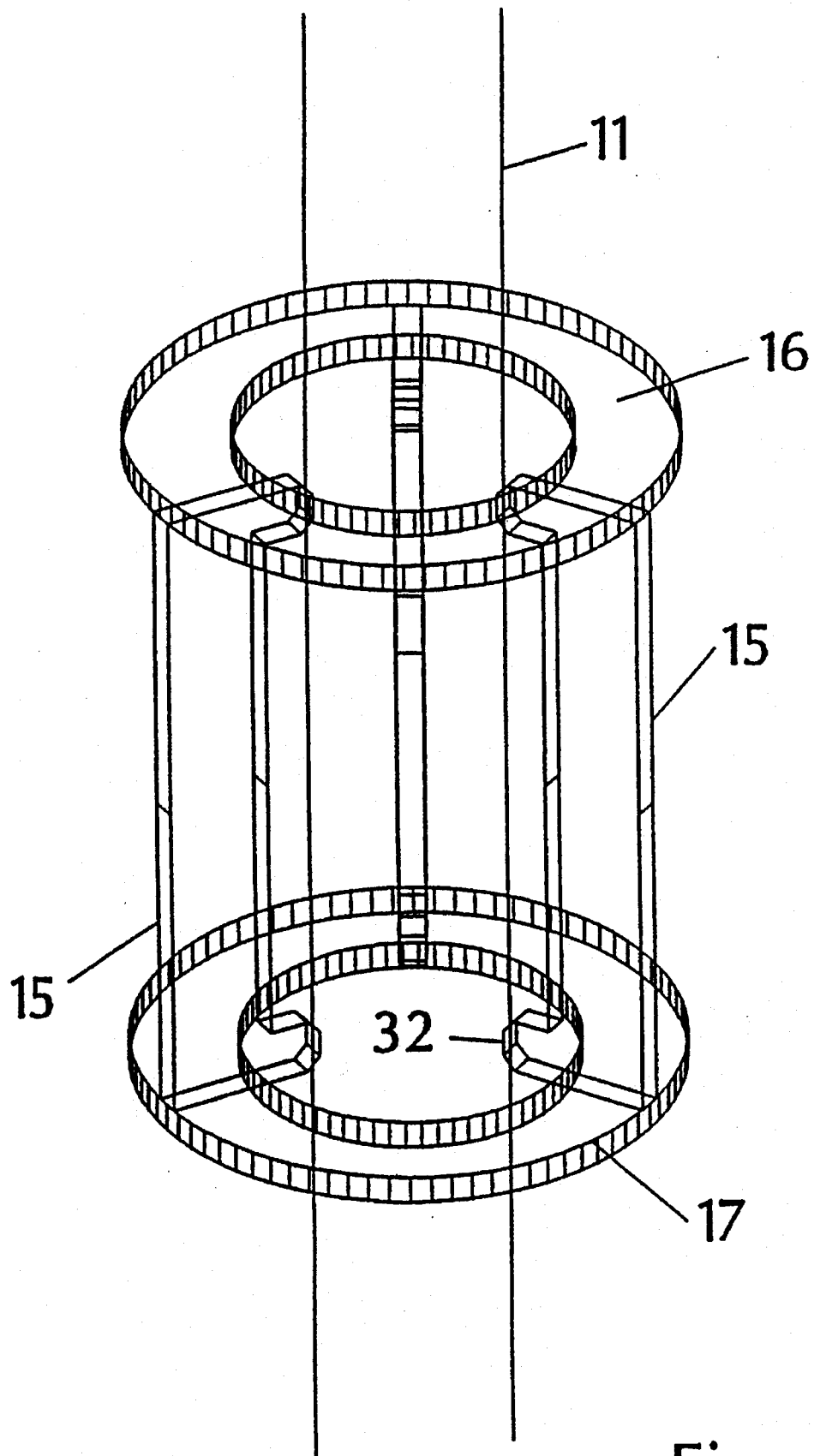
FIG. 3 is a close-up view of one embodiment of the descending collar showing the preferred open architecture.
Figure 4:
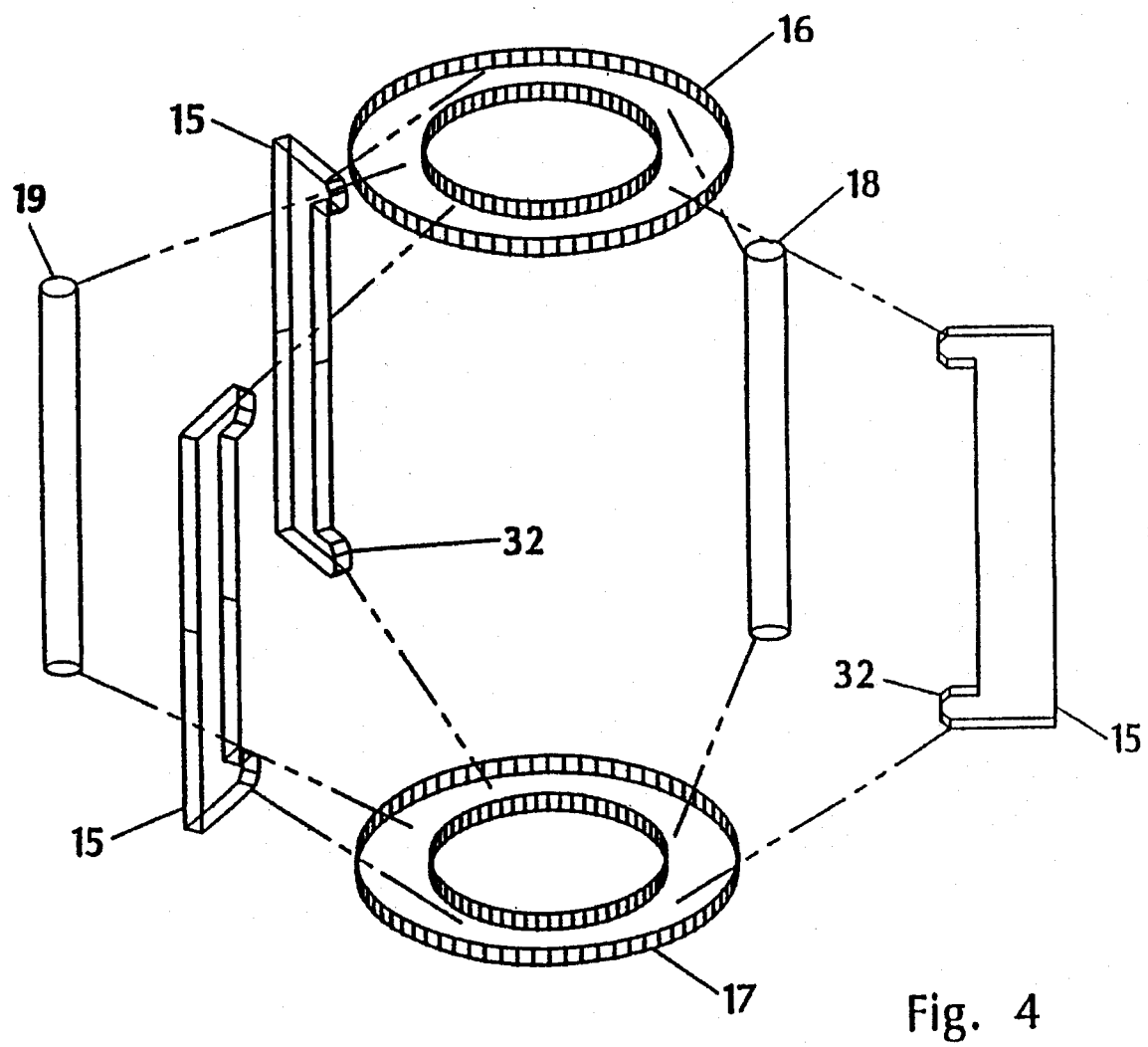
FIG. 4 is an exploded view of the embodiment of the descending collar as shown in FIG. 3.

With main tubing (11) in place, collar (14) may now be attached. Collar (14) as shown in FIGS. 3 and 4, is designed with an open architecture. In the preferred embodiment this is as functional as it is aesthetically useful. Collar (14) has top section (16) and bottom section (17) spaced and held apart by at least three spacers (15). Spacers (15) are uniquely designed such that when collar (14) is placed about main tubing (11) only tips (32) of spacers (15) contact tubing (11). This helps space collar (14) from tubing (11), allowing sediment to pass between the two elements without becoming lodged, and helps prevent collar (14) from binding onto tubing (11), allowing descent as scour occurs. Naturally, more spacers may be provided on collar (11), however, no more than six spacers is believed to be necessary for most applications.

Referring now to FIG. 4, it can be seen that collar (14) has attached primary magnet (18), and preferably secondary magnet (19) as well. In the present embodiment, each magnet (18 and 19) is a bar magnet affixed to spacers (15). It is anticipated that circular or horseshoe magnets could be utilized, and could be adequately attached to top section (16) and/or bottom section (17). Only a single magnetic source is actually needed, but because of the nature of use it is recommended that a backup magnet also be used.

The general shape of collar (14) is cylindrical, in the present embodiment, having a central bore for insertion over main tubing (11). Alternatively, collar (14) may have a hinged portion which allows collar (14) to be opened, and then closed around tubing (11). There are many other modifications possible, however, to the extent that each uses substantially the same means, in substantially the same way, to achieve substantially the same results, then these modifications should be considered to fall within the scope of the present invention. In any event, collar (14), once in place about tubing (11) is permitted to descend until it reaches stream bed (41), where it remains.

Figure 5:
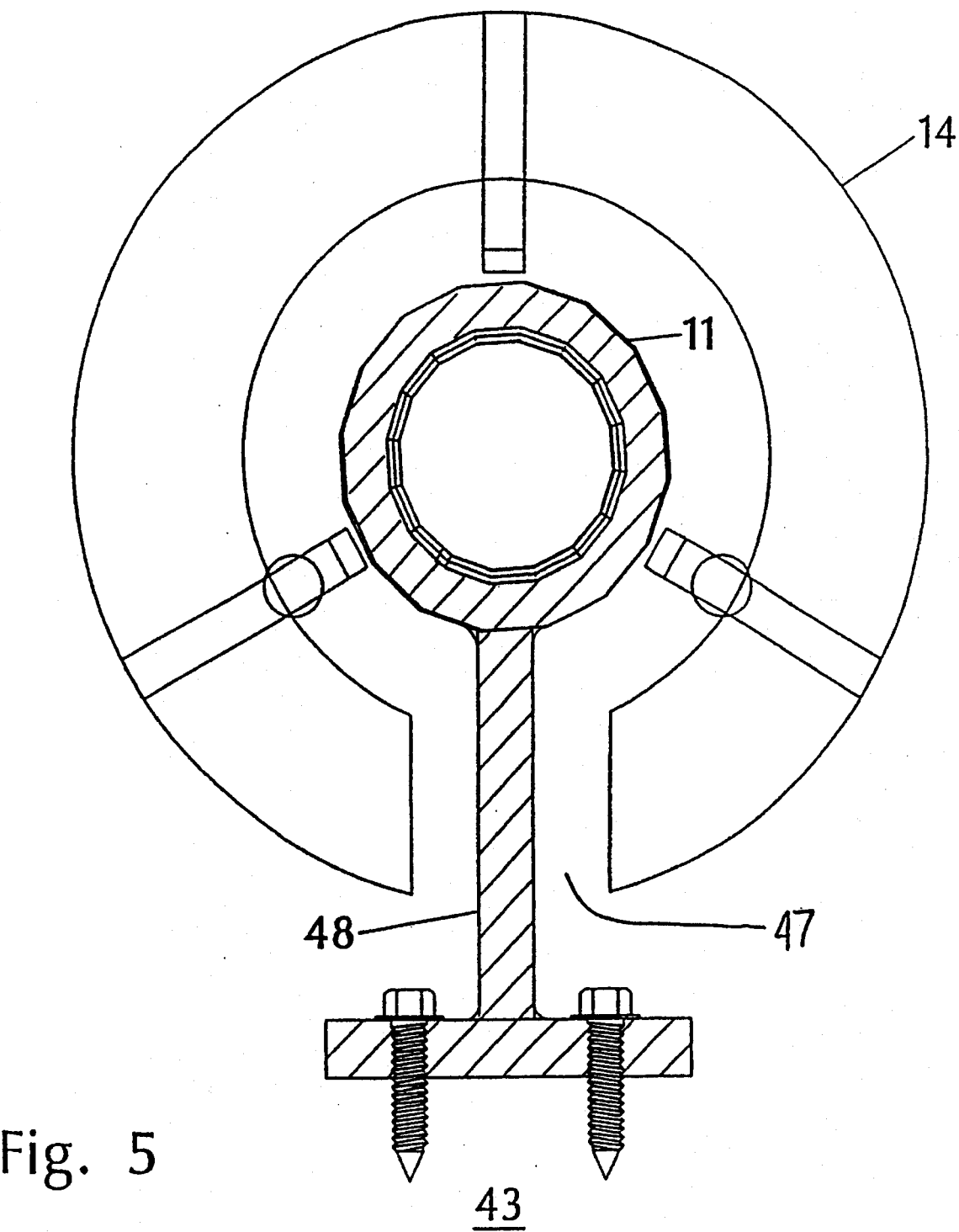
FIG. 5 shows another embodiment of the descending collar, a "C" shaped configuration, which may be used when the vertical tubing is bolted directly to a bridge pier or abutment.

Alternatively, the shape of collar (14) could be in the form of a "C". This design, as shown in FIG. 5, would still have a central bore for insertion over main tubing (11), but additionally it would allow main tubing (11) to be attached directly to bridge pier (43), a bridge foundation (45) or a bridge abutment (not shown) with flange (48), which may run the length of tubing (11). This is possible because of gap (47) in collar (14).

Figure 8:
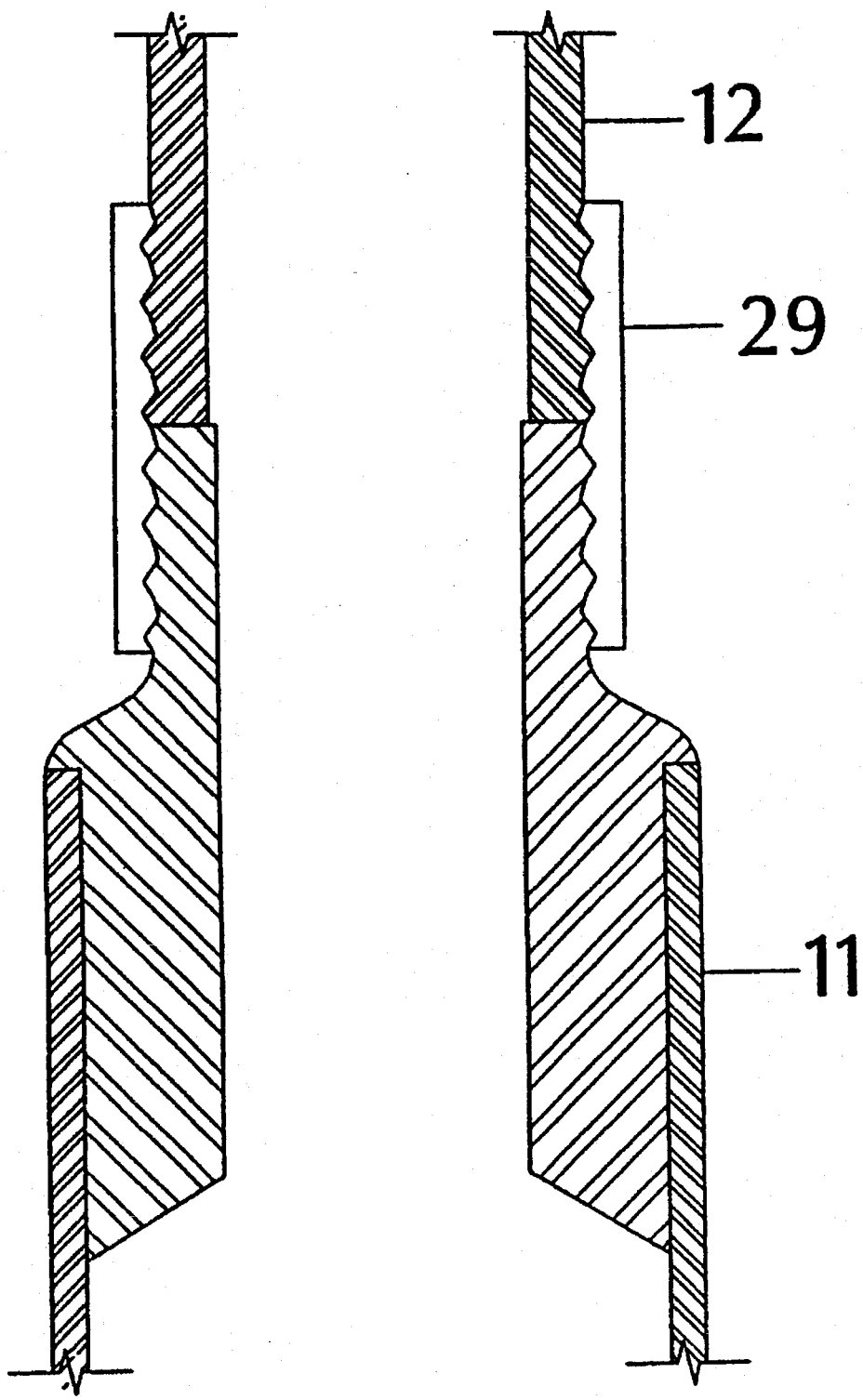
FIG. 8 is a side view of the coupling between the main tubing section and an extension section.
Figure 10:
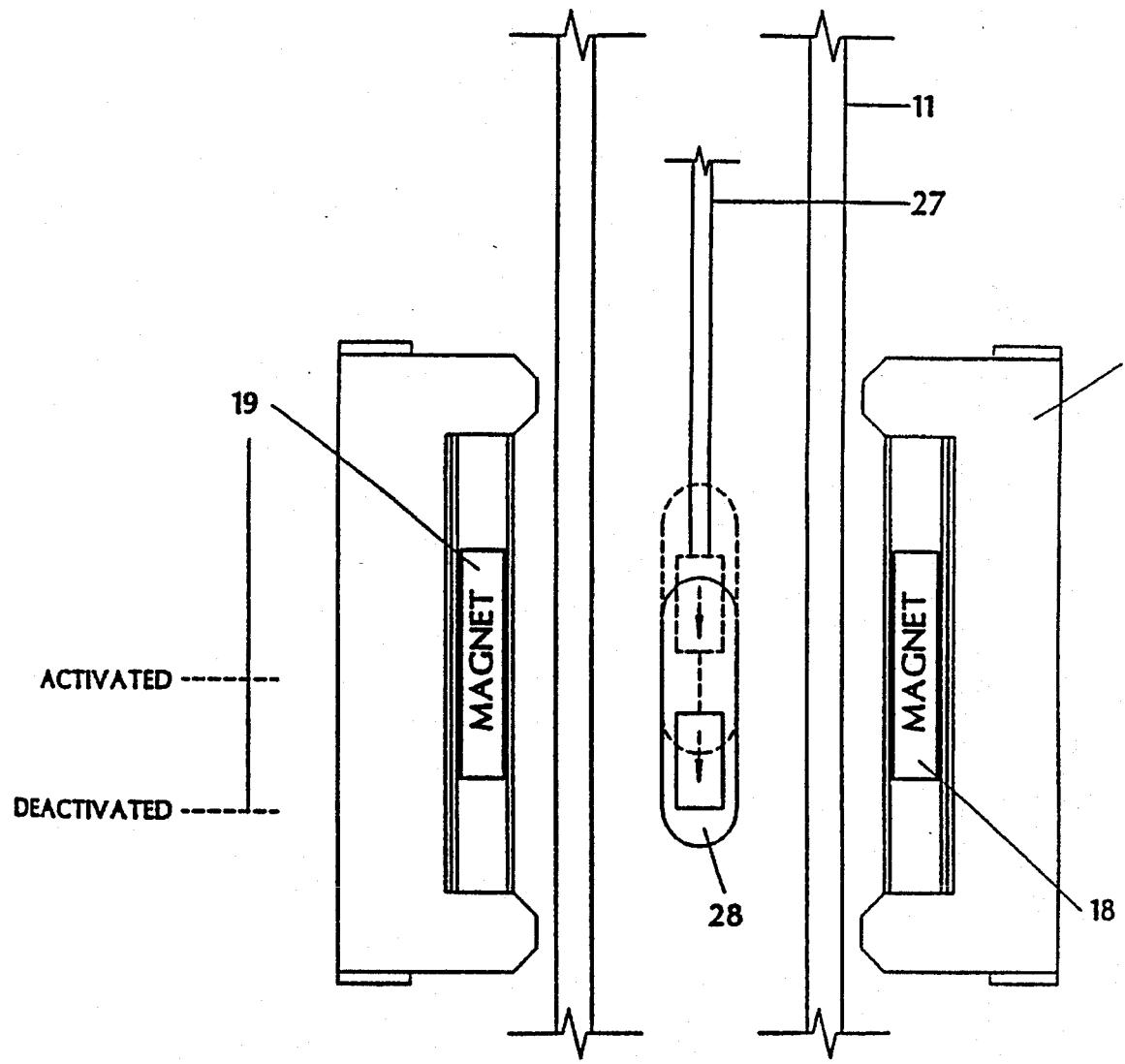
FIG. 10 is a side cross-sectional view of the probe, as shown in FIG. 9, in an activated and deactivated state of engagement with the collar.

At this point the two distinct units begin to diverge in design. Beginning with the simpler system, as shown in FIGS. 1, 8, and 9, probe (26) is used to determine the position of collar (14). Probe (26), in the present embodiment, is equipped with magnet detector (28) at one end of graduated cable (27). By lowering magnet detector (28) downward into hollow tubing (11), when detector (28) reaches the depth of primary magnet (18) it will activate as shown in FIG. 10. This activation can be indicated in a number of ways, including but not limited to a visual, tactile or audible stimulus. The present embodiment currently uses a buzzer (33) which sounds an audible signal when detector (28) is proximate to magnets (18 and 19). This technology is very well known by those in the field of detectors and signalling devices. A number of suitable devices are presently commercially available.

Figure 6A:
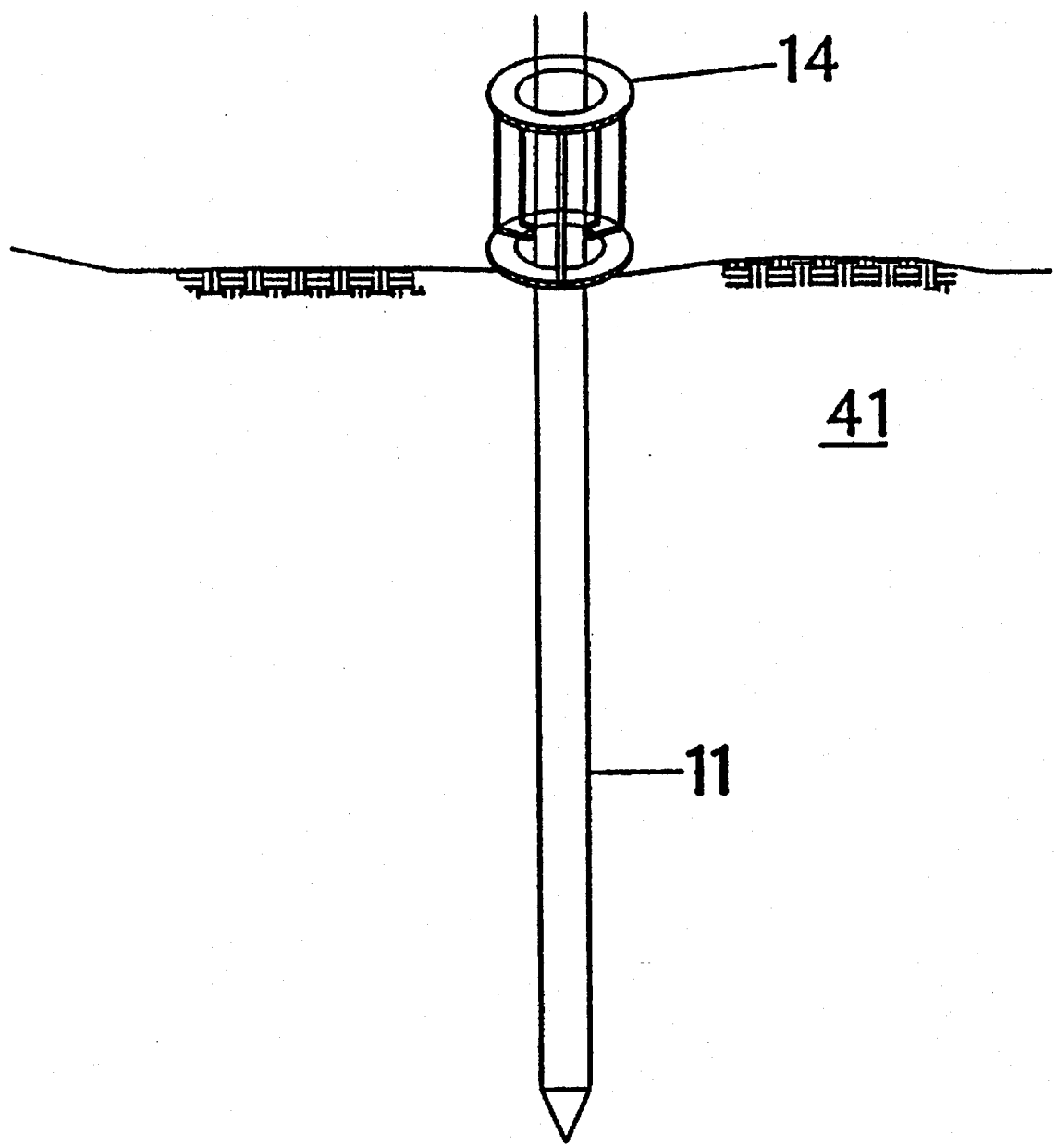
FIGS. 6a–6c is a diagrammatic illustration of scour occurring in a stream bed.
Figure 6B:
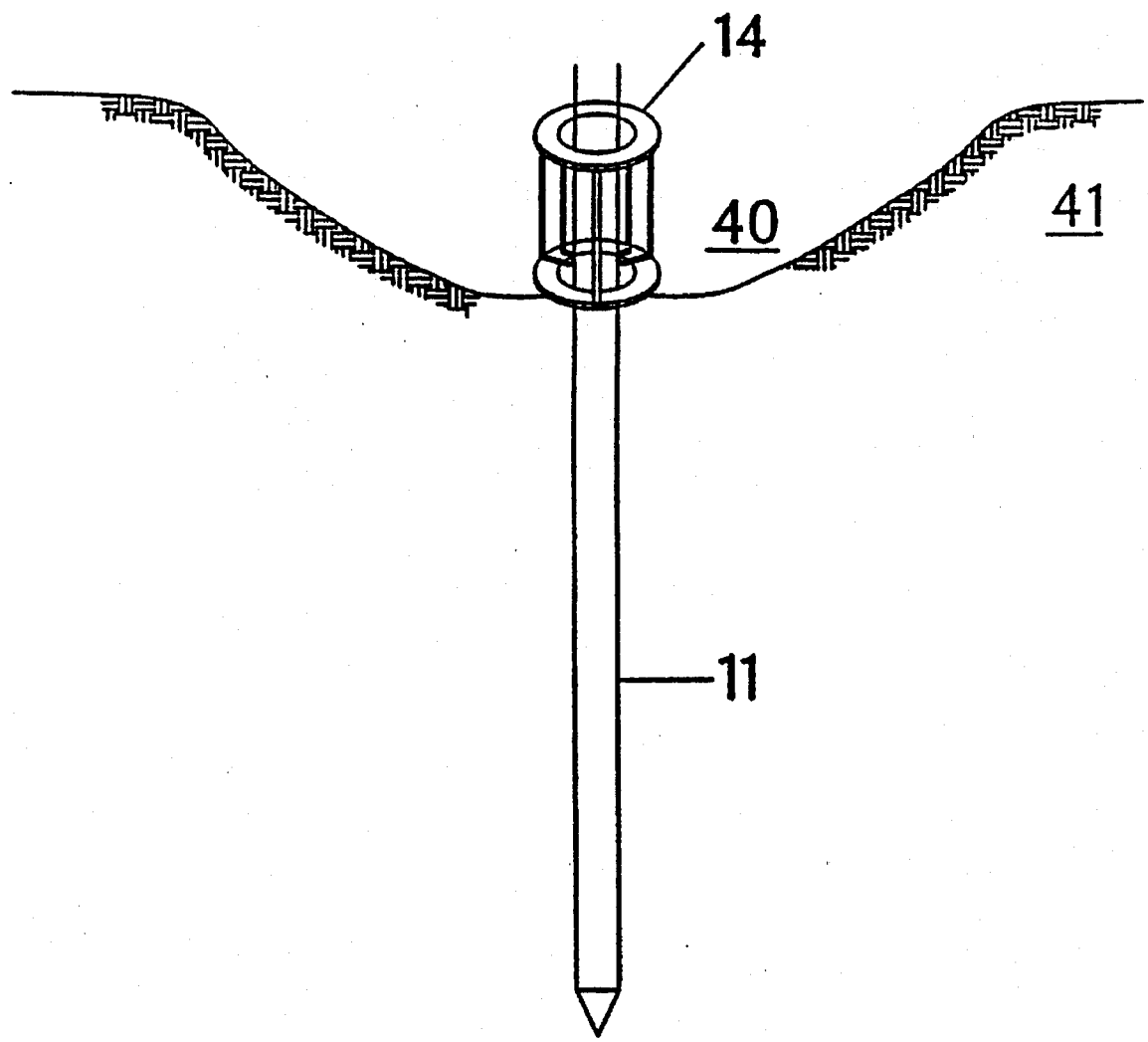
Figure 6C:
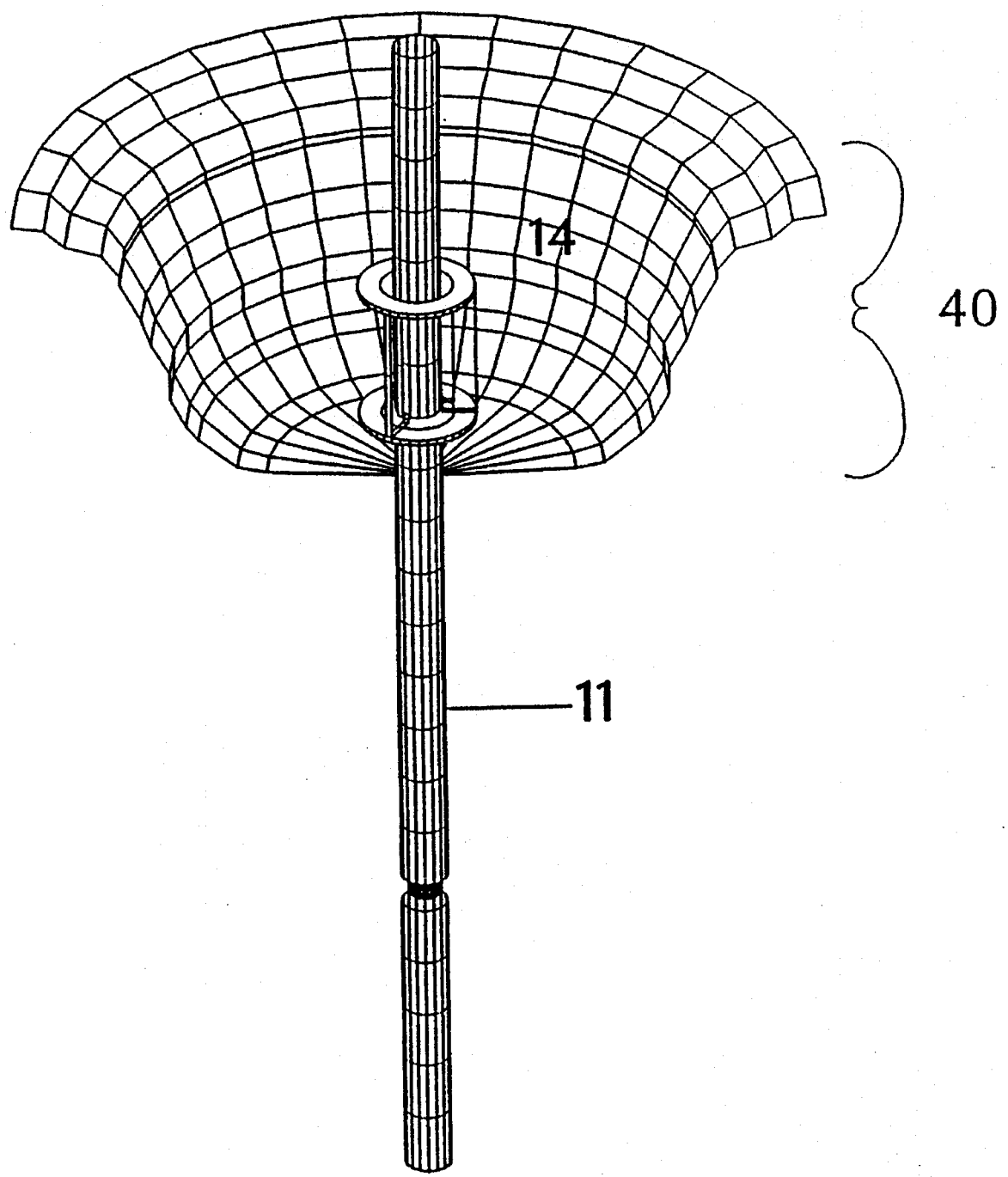
Figure 7:
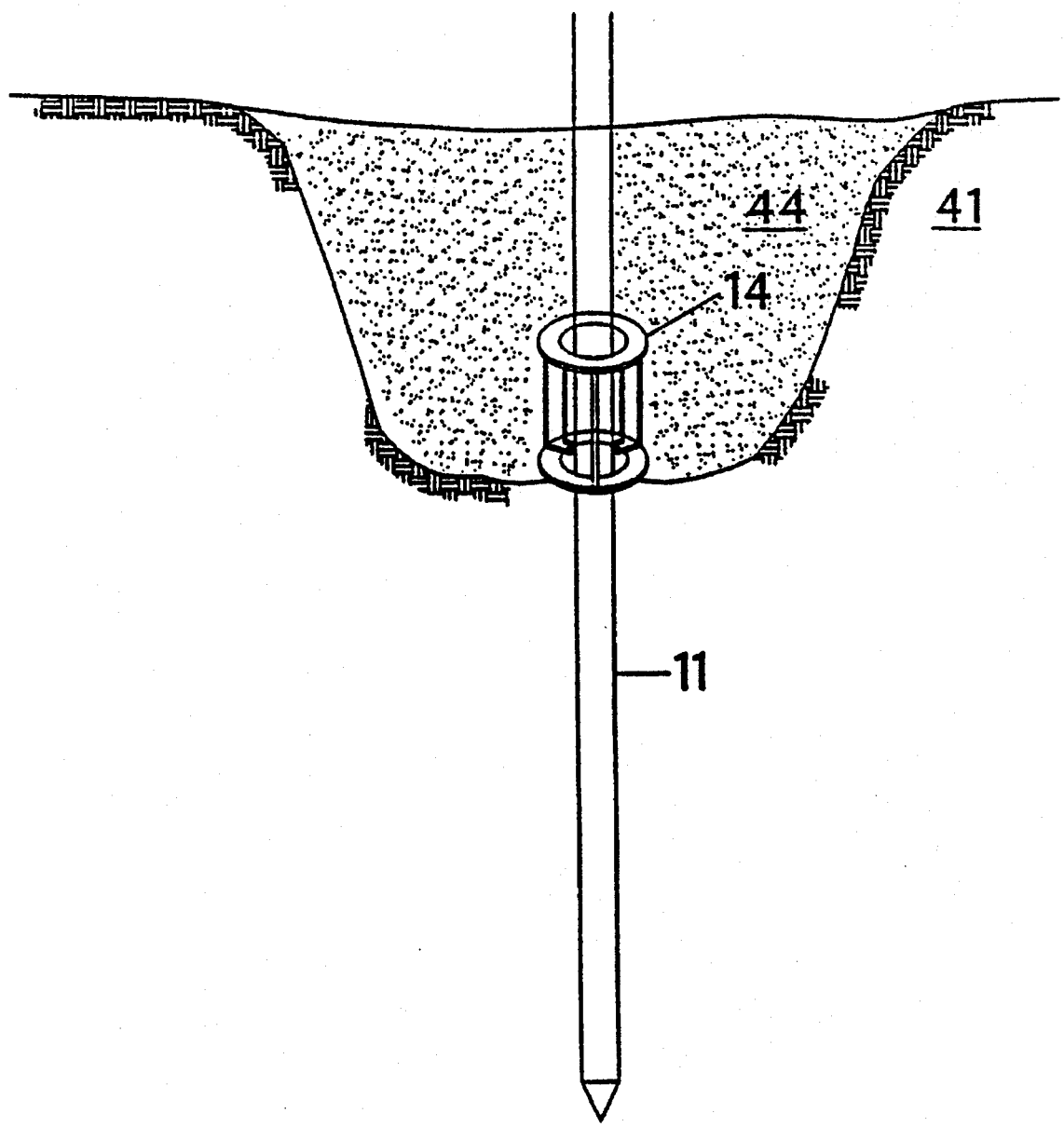
FIG. 7 is an illustration of a refilled scour hole after descent of the descending collar.

As soon as the signal is received from detector (28) the operator can determine the travel of collar (14) from a known reference point by checking graduated cable (27). The distance collar (14) has descended over a period of time is as critical to the monitoring process as the exact position of collar (14). To track this descent visually, cable (27) is preferably marked in linear increments, such as centimeter, inches, feet, meters, or the like. Periodic readings may be taken and the results of each charted to determine the progression of scour. FIGS. 6a–6c show the occurrence of scour as it might appear over time. Comparisons of initial, intermediate, and final readings would indicate the descent of collar (14), thus confirming the event of scour. Because, in many instances, scour holes refill with sediment (44), as shown in FIG. 7, collar (14) is designed to remain at the lowermost point, so that the maximum scour depth can always be determined.

Figure 11:
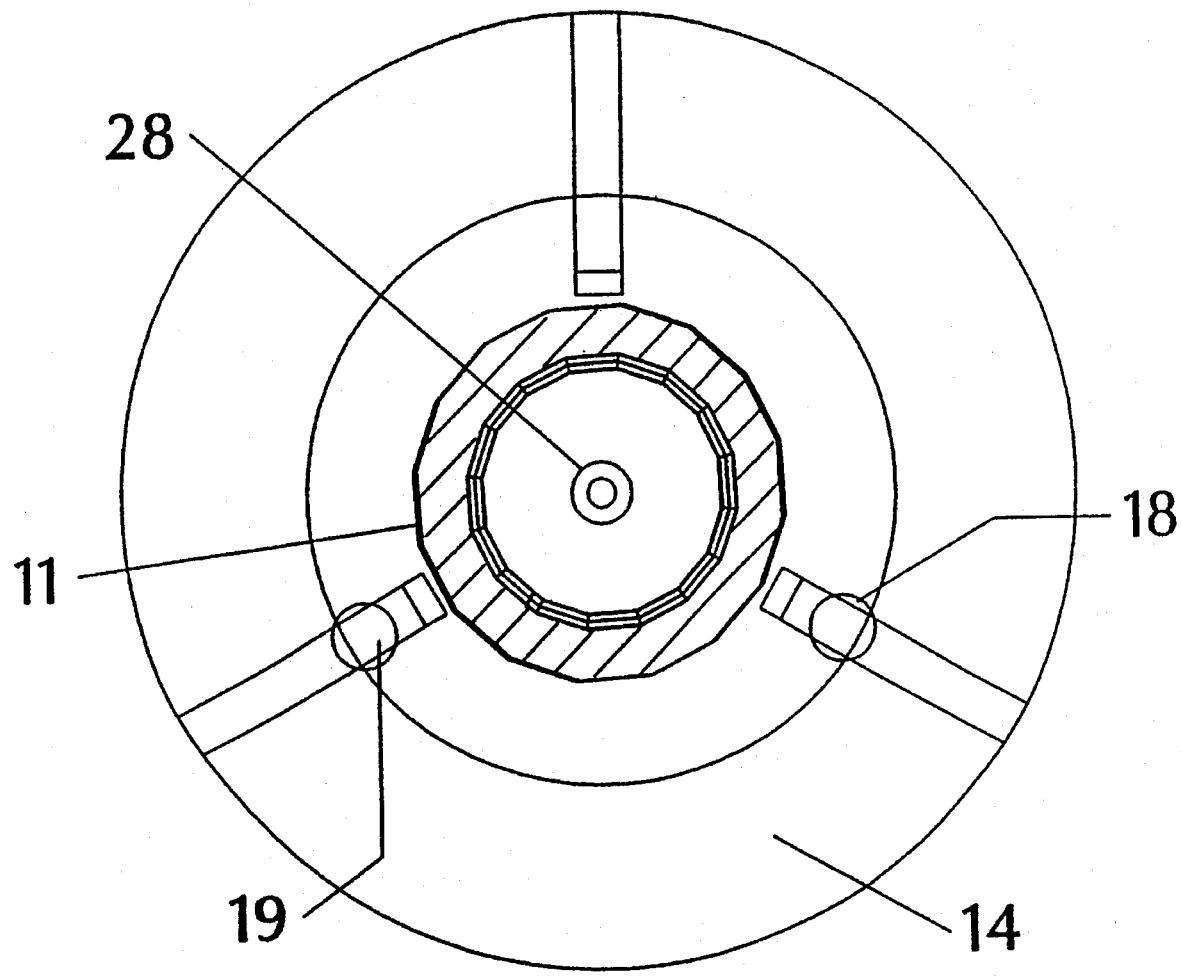
FIG. 11 is a top cross-sectional view of the system as shown in FIG. 10.

With respect to the lowering of graduated cable (27), it is anticipated that this may be done manually or automatically. A reel of cable which occasionally lowers and raises cable (27) may be used for the latter. Alternatively, the cable may remain within tubing (11), as shown in cross-section in FIG. 11, at the activated depth. Each time greater scour occurs, thereby moving the activation depth downward, cable (27) could be manually or automatically lowered to the new activation depth. In addition, not every system would necessarily require its own probe. In fact, it is preferable for a single probe to be used on any practical number of scour monitoring systems (10). A great number of bridges have a plurality of piers, each of which might require monitoring. In such a case, a single probe (26) could be used to measure the scour depth at each site. Naturally, each individual site would necessarily require its own buried main tubing (11) and collar (14).

An alternative embodiment of the present invention is shown in FIG. 2. System (10), after installation of main tubing (11) and before attachment of collar (14), may employ switch array (22). Array (22) is made up of a plurality of incrementally spaced open magnetic switches (23), preferably connected in parallel. To each magnetic switch (23) is further connected an electrical component, such as, but not limited to a resistor, capacitor, or the like. Array (22), in the present embodiment, is pulled through a flexible tubular member and then inserted into hollow tubing (11) with a silicone sealant injected into the cavity as well. Array (22) is positioned within tubing (11) so that it extends well beneath stream bed (41). After attachment of collar (14), as scour occurs, collar (14) descends and magnet (18 or 19) trips successive open magnetic switches (23) to a closed activated position, as shown by magnetic switches (24) (or vice versa). The electrical component, in this embodiment resistor (25) is used, connected to each closed switch (24) is electrically activated thereby changing the electric signal of array (22). By knowing the incremental spacing between each switch, simple calculations yield the number of closed switches and thus the depth of scour.

To prevent the occurrence of data gaps and to insure that the electronics are working, the present embodiment retains one closed (activated) switch at all times. Similar to probe (26), magnetic switch array (22) may be periodically read manually or automatically. By hooking array (22) indirectly into a computer system all the necessary calculations can be carried out. If no signal is apparent, there may be a failure in the circuitry which must be repaired. Because of its ability to be removed, such repair and/or replacement may be carried out without any undue complications.

Naturally, after any necessary repairs have been made to a monitored site, collar (14) may be replaced—removal would be necessary to make appropriate repairs to the scour hole—and re-engaged for use. If the need arises system (10) can be dismantled and re-constructed at a new site. Environmental impact is minimized by this reuse.

Unfortunately, not all bridges are identically designed, nor are they kept up by the same entity, or subject to the same scouring conditions. Therefore, the placement and complexity of each system employed must be separately considered. The present invention provides significant additional elements to boost the effectiveness of either of the basic systems previously discussed. For example, in many instances main tubing (11) will need to be placed in a position which does not allow it a straight, vertical path to the bridge surface. This is shown in FIG. 1. For applications where access is desired or required at a specific point, the present invention is capable of extension via straight extension tubing (12) and curved extension tubing (13). Because this tubing does not need to be non-ferrous and will not interfere with the free sliding of the collar, the compositions which may be utilized are more widely varied than that of main tubing (11). Ductile steel tubing, less costly than stainless steel, is just one particular type which may be suitable. FIG. 8 shows special coupling device (29) which may be used to connect main tubing (11) to extension tubing (12 and/or 13). The realization of surface access to the present invention would facilitate maintenance, repair and monitoring by roadway crews, thereby limiting the necessity of specially trained personnel and special equipment (eg. underwater bridge inspection cranes, scaffolds, and the like).

Other supplemental equipment may include data logger (30), shown in FIG. 1. This device merely stores the collected data, such as the cumulative values from switch array (22), as readings are taken. Many different types of data loggers exist which are suitable, and most are commercially available. In addition, all the relevant data may be displayed on a monitor or printed out with date and time stamps, as shown in FIG. 12. Naturally, since it is desirable to have a system which may be controlled and interrogated remotely (ie., at a central information collection and control office as indicated by (50)), means for controlling and interrogating any automated elements may be crucial in some applications. These means would not only allow engineers to communicate with the system, but also for the system to freely communicate with a central office or the like. For such, the present invention may comprise remote telemetry system (31), which might include RF transmissions, phone (including fax or modem) line interfacing, or even satellite uplinks. This technology is relatively simple to implement, and its utilization and setup would be well understood by those skilled in the relevant field.

Commercial data loggers such as the Campbell 21X may be used for this purpose of collecting and storing data. In addition to the other data loggers which may be obtained commercially, specially constructed units may also be used for logging scour data from the present invention. These commercial data loggers can be purchased with radio, satellite and telephone telemetry systems for transmission of data from a remote site to a central office.

With these automated systems it may be necessary to employ means and methods which will alert personnel of critical scour conditions. Audible bells, whistles, alarms or the like, and/or visual light sources may be hooked into the system to warn of exceeded threshold levels. These threshold values may be predetermined based on the various parameters of the monitored site. Similarly, at the bridge site automated crossing guards may be activated in such emergencies so that a critical bridge would be blocked off from traffic. Naturally, combinations of these alerting signals may be used on and off site.

In order to power any supplemental equipment, the present invention is also capable of running off AC or DC power sources. This would include, as shown in FIG. 1, solar powered sources with battery backups. Implementing these devices is within the knowledge of those skilled in the art.

The foregoing discussion and the claims which follow describe the preferred embodiments of the present invention. Particularly with respect to the claims, it should be understood that changes may be made without departing from its essence. In this regard, it is intended that such changes would still fall within the scope of the present invention. It simply is not practical to describe and claim all possible revisions to the present invention which may be accomplished. To the extent such revisions utilize the essence of the present invention using substantially the same means, in substantially the same way, to achieve substantially the same result—each would naturally fall within the breadth of protection encompassed by this patent. This is particularly true for the present invention since its basic concepts and understandings are fundamental in nature and can be broadly applied.

We claim:

1. An apparatus for the monitoring of scour in a stream bed, said apparatus comprising:
   a. a length of hollow tubing to be positioned such that said tubing extends vertically into and from a stream bed;
   b. a collar which fits around said length of tubing and rests upon said stream bed and wherein said collar moves downward with the event of scour, said collar comprising:
      (1) a top section and a bottom section;
      (2) a plurality of vertical spacers located between said top and bottom sections; and
      (3) at least one bar magnet attached to at least one of said vertical spacers; and
   c. a means for determining the vertical position of said collar along said tubing, wherein said means for determining comprises:
      (1) a plurality of magnetic switches; and
      (2) a plurality of electrical components, at least one component linked to one said magnetic switch.

2. An apparatus for the monitoring of scour as described in claim 1 wherein said means for determining the vertical position of said collar is contained within said tubing.

3. An apparatus for the monitoring of scour as described in claim 2 wherein said electrical components comprise resistors.

4. An apparatus for the monitoring of scour as described in claim 2 wherein said electrical components comprise magnetic field sensors.

5. An apparatus for the monitoring of scour as described in claim 2 wherein said electrical components comprise capacitors.

6. An apparatus for the monitoring of scour as described in claim 1 wherein said plurality of magnetic switches are initially open, said apparatus further comprising a means for closing said magnetic switches.

7. An apparatus for the monitoring of scour as described in claim 6 wherein said means for closing said magnetic switches is selective, whereby said means closes only certain of said switches.

8. An apparatus for the monitoring of scour as described in claim 6 and further comprising a means for activating said electrical components, wherein said means is responsive to said means for closing said magnetic switches.

9. An apparatus for the monitoring of scour as described in claim 8 wherein said means for determining the vertical position of said collar further comprises a means for calculating a cumulative value of said activated components.

10. An apparatus for the monitoring of scour as described in claim 2, wherein said plurality of spacers equals three.

11. An apparatus for the monitoring of scour as described in claim 1 wherein said collar further comprises at least one backup magnet attached to another of said vertical spacers.

12. An apparatus for the monitoring of scour as described in claim 2 wherein said hollow tubing is segmented.

13. An apparatus for the monitoring of scour as described in claim 2 wherein said tubing comprises a conical driving tip.

14. An apparatus for the monitoring of scour as described in claim 13 wherein conical driving tip comprises a means for penetrating said stream bed.

15. An apparatus for the monitoring of scour as described in claim 1 and further comprising a means for preventing said collar from binding on said tubing.

16. An apparatus for the monitoring of scour as described in claim 15 wherein said means for preventing said collar from binding comprises said tubing to be contacted only by said spacers of said collar.

17. An apparatus for the monitoring of scour as described in claim 16 wherein each said spacer contacts said tubing at only two points.

18. An apparatus for the monitoring of scour as described in claim 9 and further comprising a means for alerting of severe scour.

19. An apparatus for the monitoring of scour as described in claim 18 wherein said means for alerting comprises a monitor, and wherein said monitor comprises a means for displaying the cumulative value of said activated components.

20. An apparatus for the monitoring of scour as described in claim 18 wherein said means for alerting comprises an alarm system which is activated when a threshold cumulative value is reached.

21. An apparatus for the monitoring of scour as described in claim 20 wherein said alarm system comprises a visual signal.

22. An apparatus for the monitoring of scour as described in claim 20 wherein said alarm system comprises an audible signal.

23. An apparatus for the monitoring of scour as described in claim 21 or 22 wherein said system further comprises a means for transmitting said signal to a remote location.

24. An apparatus for the monitoring of scour as described in claim 23 wherein said means for transmitting said signal to a remote location comprises a telephone line.

25. An apparatus for the monitoring of scour as described in claim 23 wherein said means for transmitting said signal to a remote location comprises a data satellite uplink.

26. An apparatus for the monitoring of scour as described in claim 23 wherein said means for transmitting said signal to a remote location comprises an RF transmission.

27. An apparatus for the monitoring of scour as described in claim 9 and further comprising an automated data readout, wherein said data readout comprises a means for providing desired scour data based upon said cumulative value.

28. An apparatus for the monitoring of scour as described in claim 27 and further comprising a data logger, wherein said logger comprises a means for storing said desired scour data.

29. An apparatus for the monitoring of scour as described in claim 28 wherein said means for storing said desired scour data comprises a time/date stamp.

30. An apparatus for the monitoring of scour as described in claim 28 wherein said means for storing said desired scour data comprises a printout.

31. An apparatus for the monitoring of scour as described in claim 1, 19, 27 or 28 and further comprising a telemetry system, wherein said system comprises a means for interacting with said apparatus from a remote location.

32. An apparatus for the monitoring of scour in a stream bed, said apparatus comprising:

a. a length of hollow main tubing to be positioned such that said tubing extends into and from a stream bed;

b. a collar comprising at least one magnet, wherein said collar fits around said length of tubing and rests upon said stream bed and wherein said collar moves downward with the event of scour; and c. a means for determining the vertical position of said collar along said tubing, wherein said means for determining comprises:

(1) a length of flexible cable having two ends; and (2) a magnet detector attached to one end of said flexible cable;

(3) a means for emitting a signal attached to the other end of said flexible cable.

33. An apparatus for the monitoring of scour as described in claim 32 wherein said length of said main tubing is buried substantially in said stream bed, said apparatus further comprising a means for extending said tubing to the bridge surface.

34. An apparatus for the monitoring of scour as described in claim 33 wherein said means for extending comprises rigid hollow extension tubing.

35. An apparatus for the monitoring of scour as described in claim 32 wherein said main tubing is stainless steel.

36. An apparatus for the monitoring of scour as described in claim 34 wherein said extension tubing comprises curved and straight tubing components.

37. An apparatus for the monitoring of scour as described in claim 32 wherein said collar comprises open architecture.

38. An apparatus for the monitoring of scour as described in claim 37 wherein said open architecture comprises a top portion, a bottom portion and a plurality of spacers wherein said magnet is attached to at least one of said spacers.

39. An apparatus for the monitoring of scour as described in claim 37 wherein said open architecture comprises a top portion, a bottom portion and a plurality of spacers wherein said magnet is attached to said top portion.

40. An apparatus for the monitoring of scour as described in claim 37 wherein said open architecture comprises a top portion, a bottom portion and a plurality of spacers wherein said magnet is attached to said bottom portion.

41. An apparatus for the monitoring of scour as described in claim 38 wherein said number of spacers is three.

42. An apparatus for the monitoring of scour as described in claim 32 wherein said flexible cable is graduated.

43. An apparatus for the monitoring of scour as described in claim 1 or 32 wherein said means for determining the vertical position of said collar is removable from said apparatus.

44. An apparatus for the monitoring of scour as described in claim 43 wherein said means for determining the vertical position of said collar can be used at a plurality of bridge sites.

45. An apparatus for the monitoring of scour as described in claim 38 wherein said collar further comprises at least one backup magnet attached to another of said vertical spacers.

46. An apparatus for the monitoring of scour as described in claim 32 and further comprising a means for preventing said collar from binding on said tubing.

47. An apparatus for the monitoring of scour as described in claim 46 wherein said means for preventing said collar from binding on said tubing comprises said tubing to be contacted by only said spacers of said collar.

48. An apparatus for the monitoring of scour as described in claim 47 wherein each said spacer contacts said tubing at only two points.

49. An apparatus for the monitoring of scour as described in claim 32 and further comprising means for alerting of severe scour.

50. An apparatus for the monitoring of scour as described in claim 49 wherein said means for alerting comprises a monitor, and wherein said monitor comprises a means for displaying a cumulative value of said activated components.

51. An apparatus for the monitoring of scour as described in claim 49 wherein said means for alerting comprises an alarm system which is activated when a threshold cumulative value is reached.

52. An apparatus for the monitoring of scour as described in claim 51 wherein said alarm system comprises a visual signal.

53. An apparatus for the monitoring of scour as described in claim 51 wherein said alarm system comprises an audible signal.

54. An apparatus for the monitoring of scour as described in claim 52 or 53 wherein said system further comprises a means for transmitting said signal to a remote location.

55. An apparatus for the monitoring of scour as described in claim 54 wherein said means for transmitting said signal to a remote location comprises a telephone line.

56. An apparatus for the monitoring of scour as described in claim 54 wherein said means for transmitting said signal to a remote location comprises a data satellite uplink.

57. An apparatus for the monitoring of scour as described in claim 54 wherein said means for transmitting said signal to a remote location comprises an RF transmission.

58. An apparatus for the monitoring of scour as described in claim 49 and further comprising an automated data readout, wherein said data readout comprises a means for providing desired scour data based upon said cumulative values.

59. An apparatus for the monitoring of scour as described in claim 58 and further comprising a data logger, wherein said logger comprises a means for storing said desired scour data.

60. An apparatus for the monitoring of scour as described in claim 32 or 59 and further comprising a remote telemetry system, wherein said system comprises a means for interacting with said apparatus from a remote location.

61. An apparatus for the monitoring of scour as described in claim 60 and further comprising a power source wherein said power source comprise Solar DC system with a battery backup.

62. A method for monitoring scour within a stream bed comprising the steps of:
 a. driving a rigid tubular member into said stream bed; then
 b. inserting a plurality of open switches linked sequentially and spaced equally apart within said tubular member, and wherein each said switch is electrically connected to an electrical component; then
 c. placing a non-floating collar about said tubular member; then
 d. allowing said collar to rest upon the surface of said stream bed; while also
 e. allowing said collar to descend incrementally as scour occurs to said stream bed; while
 f. closing one of said switches with each predetermined increment of descent of said collar thereby electrically engaging said electrical component; then
 g. periodically determining an amount of scour occurring within said stream bed.

63. A method for monitoring scour as described in claim 62 wherein said step of periodically determining comprises the step of determining the amount of descent of said collar.

64. A method for monitoring scour as described in claim 63 wherein said step of determining the amount of descent comprises the step of calculating the cumulative value of said engaged electrical components.

65. A method for monitoring scour as described in claim 62 wherein said switches are magnetic and said collar comprises a bar magnet, and wherein said step of closing one of said switches comprises the step of tripping said magnetic switches with said bar magnet.

66. A method for monitoring scour as described in claim 62 wherein said step of allowing said collar to descend comprises the step of preventing said collar from binding upon said tubular member during descent.

67. A method for monitoring scour as described in claim 66 wherein collar comprises a plurality of vertical spacers, said step of preventing said collar from binding comprises the step of contacting said tubular member with only said vertical spacers.

68. A method for monitoring scour as described in claim 64 and further comprising the step of logging calculated values from said step of determining the amount of descent of said collar.

69. A method for monitoring scour as described in claim 62 wherein said step of driving said tubular member into a stream bed comprises the step of manually pounding said tubular member downward.

70. A method for monitoring scour as described in claim 68 and further comprising the step of controlling said step of logging calculated values, wherein said step of controlling is performed remotely.

71. A method for monitoring scour as described in claim 62 and further comprising the step of controlling said step of periodically determining the amount of scour, wherein said step of controlling is performed remotely.

72. A method for monitoring scour within a stream bed, wherein said stream bed has a surface, comprising the steps of:
 a. driving a rigid hollow tubular member into said stream bed; then
 b. placing a non-floating collar about said tubular member, wherein said collar comprises at least one magnetic body; then
 c. allowing said collar to rest upon the surface of said stream bed; while also
 d. allowing said collar to descend incrementally as scour occurs to said stream bed; then
 e. periodically determining an amount of scour occurring within said stream bed, wherein said step of periodically determining comprises the steps of:
  (1) lowering a probe into said hollow tubular member; then
  (2) activating said probe with said magnetic body as it reaches the depth of said collar.

73. A method for monitoring scour as described in claim 72 wherein said step of periodically determining the amount of scour further comprises the step of assessing the distance said probe is lowered into said hollow tubular member.

74. A method for monitoring scour as described in claim 72 wherein said step of allowing descent comprises the step of preventing said collar from binding upon said tubular member during descent.

75. A method for monitoring scour as described in claim 74 wherein collar comprises a plurality of vertical spacers, said step of preventing said collar from binding comprises the step of contacting said tubular member with only said vertical spacers.

76. A method for monitoring scour as described in claim 73 and further comprising the step of logging said distances from said step of assessing the distance lowered.

77. A method for monitoring scour as described in claim 72 wherein said step of driving said tubular member into a stream bed comprises the step of manually pounding said tubular member downward.

78. A method for monitoring scour as described in claim 62 or 72 wherein said step of driving comprises the step of pneumatically forcing said tubular member downward.

79. A method for monitoring scour as described in claim 62 or 72 wherein said step of driving comprises the step of hydraulically forcing said tubular member downward.

80. A method for monitoring scour as described in claim 78 wherein said step of driving comprises the step of jetting said stream bed to permit descent of said tubular member.

81. A method for monitoring scour as described in claim 79 wherein said step of driving comprises the step of jetting said stream bed to permit descent of said tubular member.

82. A method for monitoring scour as described in claim 72 or 77 wherein said step of driving comprises the step of jetting said stream bed to permit descent of said tubular member.

83. A method for monitoring scour as described in claim 72 or 73 and further comprising the step of retaining said collar at its maximum descent throughout said step of allowing said collar to descend.

84. A method for monitoring scour as described in claim 72 wherein said step of lowering is performed manually.

85. A method for monitoring scour as described in claim 72 wherein said step of lowering is performed automatically.

86. A method for monitoring scour as described in claim 72 and further comprising the step of controlling the step of periodically determining the amount of scour, wherein said step of controlling is performed remotely.

87. A method for monitoring scour as described in claim 72, 84 or 85 and further comprising the step of controlling the step of lowering, wherein said step of controlling is performed remotely.

88. A method for monitoring scour as described in claim 76 and further comprising the step of controlling said step of logging, wherein said step of controlling is performed remotely.

* * * * *